(12) United States Patent  
Arai et al.

(10) Patent No.: US 12,454,267 B2  
(45) Date of Patent: Oct. 28, 2025

(54) DRIVING SUPPORT APPARATUS, DRIVING SUPPORT METHOD, AND NON-TRANSITORY COMPUTER-READABLE STORAGE MEDIUM

(71) Applicant: TOYOTA JIDOSHA KABUSHIKI KAISHA, Toyota (JP)

(72) Inventors: Chiemi Arai, Susono (JP); Yuta Ikezawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 367 days.

(21) Appl. No.: 18/083,973

(22) Filed: Dec. 19, 2022

(65) Prior Publication Data

US 2023/0192091 A1 Jun. 22, 2023

(30) Foreign Application Priority Data

Dec. 22, 2021 (JP) .................................. 2021-208650

(51) Int. Cl.
*B60W 30/18* (2012.01)
*B60W 50/14* (2020.01)

(52) U.S. Cl.
CPC ...... *B60W 30/18159* (2020.02); *B60W 50/14* (2013.01); *B60W 2552/05* (2020.02); *B60W 2552/53* (2020.02); *B60W 2710/18* (2013.01); *B60W 2720/106* (2013.01)

(58) Field of Classification Search
CPC .................... B60W 2710/18; B60W 2720/106
See application file for complete search history.

(56) References Cited

U.S. PATENT DOCUMENTS

| 8,355,851 B2 | 1/2013 | Inoue et al. |
| 8,370,040 B2 | 2/2013 | Inoue et al. |
| 8,417,430 B2 | 4/2013 | Saek |

(Continued)

FOREIGN PATENT DOCUMENTS

| JP | 2011-129013 A | 6/2011 | |
| JP | 2020-004333 A | 1/2020 | |
| WO | WO-2022054712 A1 * | 3/2022 | ........ B60W 60/0015 |

OTHER PUBLICATIONS

English WIPO translation of WO-2022054712-A1. (Year: 2022).*
English WIPO translation of JP-2020004333-A. (Year: 2020).*

*Primary Examiner* — Jason Holloway
*Assistant Examiner* — Christopher A Buksa
(74) *Attorney, Agent, or Firm* — Sughrue Mion, PLLC

(57) ABSTRACT

A driving support apparatus includes a surrounding sensor which acquires surrounding information, and a control unit which executes driving support control when a execution condition is satisfied. The control unit performs overwrite processing or retention processing based on whether or not a specific condition is satisfied. The specific condition is satisfied when the number of types of directions other than a straight direction included in permitted travel directions of a first road arrow marking detected at a first time point is less than the number of types of directions other than a straight direction included in the permitted travel directions included in second road arrow information already stored in a storage device at the first time point. The control unit then determines whether or not the execution condition is satisfied at the first time point based on the overwritten or retained road arrow information.

7 Claims, 15 Drawing Sheets

(56) References Cited

U.S. PATENT DOCUMENTS

| | | |
|---|---|---|
| 8,548,709 B2 | 10/2013 | Morita |
| 8,768,597 B2 | 7/2014 | Kagawa |
| 9,174,643 B2 | 11/2015 | Aso |
| 10,017,178 B2 | 7/2018 | Morimoto et al. |
| 10,118,617 B2 | 11/2018 | Urano et al. |
| 10,486,698 B2 | 11/2019 | Masui et al. |
| 2019/0295419 A1 | 9/2019 | Tosa et al. |
| 2020/0001875 A1 | 1/2020 | Kato et al. |
| 2020/0109953 A1* | 4/2020 | Hokai .................... G06F 16/29 |

* cited by examiner

DRIVING SUPPORT APPARATUS, DRIVING SUPPORT METHOD, AND NON-TRANSITORY COMPUTER-READABLE STORAGE MEDIUM

BACKGROUND OF THE INVENTION

1. Field of the Invention

The present invention relates to a driving support apparatus, a driving support method, and a non-transitory computer-readable storage medium, each of which being capable of executing driving support control including pre-right/left-turn deceleration assist control of assisting in deceleration of a vehicle before a right or left turn at an intersection and/or pre-right/left-turn warning control of warning a driver of the vehicle before a right or left turn at an intersection.

2. Description of the Related Art

In recent years, technologies for executing driving support control of supporting decelerating a speed of a vehicle (vehicle speed) to a predetermined target vehicle speed before a right or left turn at an intersection have been researched and developed. The driving support control includes at least one of pre-right/left-turn deceleration assist control or pre-right/left-turn warning control. The pre-right/left-turn deceleration assist control is control of automatically applying a braking force to the vehicle so that a deceleration of the vehicle matches a target deceleration and thereby assisting in deceleration of the vehicle before a right or left turn at an intersection. The pre-right/left-turn warning control is control of warning a driver of the vehicle and thereby prompting the driver to perform a deceleration operation before a right or left turn at an intersection.

For example, in Japanese Patent Application Laid-open No. 2011-129013, there is described a travel support apparatus (hereinafter referred to as "related-art apparatus") configured to issue a warning before a vehicle enters an intersection when the vehicle speed exceeds a predetermined vehicle speed (vehicle speed at which the vehicle can safely turn at the intersection) before the vehicle performs a right or left turn at the intersection.

The related-art apparatus determines whether or not a vehicle is going to turn right or left at an intersection based on a road arrow marking on a traveling lane (lane on which the vehicle is traveling). Specifically, the related-art apparatus determines that the vehicle is going to turn right or left when the road arrow marking on the traveling lane recognized by an image pickup device includes a right-turn arrow and/or a left-turn arrow.

In Japanese Patent Application Laid-open No. 2011-129013, "image pickup device" and "road arrow marking" are referred to as "CCD camera" and "road surface paint," respectively.

The road arrow marking is an arrow-shaped road marking indicating permitted travel directions of the lane, and a plurality of road arrow markings are generally arranged before an intersection at intervals in the direction in which the lane extends. The road arrow marking may have become faint (become faded) due to deterioration over time. In a case in which there are a plurality of road arrow markings, when the right-turn arrow (or left-turn arrow) of at least one of those road arrow markings has become faint due to deterioration over time, the image pickup device may not be able to recognize the right-turn arrow (or left-turn arrow) of the road arrow marking, and as a result, the related-art apparatus may determine that the vehicle is not going to turn right (or left), and may not be able to properly issue a warning.

Further, depending on the layout of the intersection (for example, an intersection in which a pedestrian bridge is arranged), the type of road arrow marking in the rightmost (or leftmost) lane may change along the travel direction of the vehicle from "straight arrow and right-turn arrow (or left-turn arrow)" to "straight arrow" (see FIG. 6A). In this case, at the time point at which the road arrow marking to be recognized by the image pickup device changes from "straight arrow and right-turn arrow (or left-turn arrow)" to "straight arrow," the related-art apparatus determines that the vehicle is not going to turn right (or left), and hence may stop issuing the warning even when, for example, the "vehicle is going to turn right or left and the vehicle speed still exceeds the predetermined vehicle speed."

Thus, with a configuration in which "it is determined whether or not a vehicle is going to turn right or left based on the type of road arrow marking recognized by the image pickup device, and driving support control (in the above-mentioned example, pre-right/left-turn warning control) is executed based on whether or not the vehicle is going to turn right or left", driving support control cannot be appropriately executed in a case, for example, in which the right-turn arrow (or left-turn arrow) of the road arrow marking has become faint, or the type of road arrow marking has changed along the travel direction of the vehicle from "straight arrow and right-turn arrow (or left-turn arrow)" to a "straight arrow."

SUMMARY OF THE INVENTION

The present invention has been made in order to cope with the above-mentioned problems. That is, one object of the present invention is to provide a technology capable of appropriately executing driving support control.

According to at least one embodiment of the present invention, there is provided a driving support apparatus (hereinafter also referred to as "apparatus of the present invention") including: a surrounding sensor (11, 12) configured to acquire information relating to a road marking and an intersection present in a front area, which is an area including a road surface in front of a vehicle (V), as surrounding information; and a control unit (10) including a storage device, the control unit being configured to execute, when a predetermined execution condition including an intersection being detected based on the surrounding information is satisfied, driving support control including at least one of pre-right/left-turn deceleration assist control of automatically applying a braking force to the vehicle so that a deceleration of the vehicle matches a target deceleration and thereby assisting in deceleration of the vehicle to a predetermined target vehicle speed before the vehicle performs one of a right turn or a left turn at the detected intersection, or pre-right/left-turn warning control of warning a driver of the vehicle and thereby prompting the driver to perform a deceleration operation before the vehicle performs one of a right turn or a left turn at the detected intersection.

The control unit is configured to: store, in a case in which an intersection (I1, I2) is detected based on the surrounding information, when a road arrow marking is detected on a traveling lane (L1, L2), which is a lane on which the vehicle is traveling, road arrow information, which is information including the road arrow marking and permitted travel directions of the traveling lane indicated by the road arrow marking, in the storage device in association with the detected intersection; determine whether a specific condition is satisfied (Step 840), the specific condition being satisfied when, in a case in which a certain intersection is detected based on the surrounding information, the number of types (t1) of directions other than a straight direction included in the permitted travel directions of the traveling lane indicated by a first road arrow marking, which is the road arrow marking detected at a certain first time point, is less than the number of types (t2) of directions other than a straight direction included in the permitted travel directions of the traveling lane included in second road arrow information, which is the road arrow information already stored in the storage device in association with the certain intersection detected at the first time point; perform, based on whether the specific condition is satisfied, one of overwrite processing of overwriting and storing the second road arrow information with first road arrow information, which is road arrow information on the first road arrow marking, at the first time point, or retention processing of retaining the second road arrow information at the first time point; and determine whether the predetermined execution condition is satisfied at the first time point based on the overwritten or retained road arrow information.

In the apparatus of the present invention, whether or not the execution condition is satisfied is determined not based on the road arrow information on the road arrow marking detected based on the surrounding information, but based on the overwritten or retained road arrow information (that is, the road arrow information stored in the storage device). Which of the overwrite processing or the retention processing is to be performed is determined based on whether or not the specific condition is satisfied. The specific condition is satisfied when the "number of types t1 of directions other than a straight direction of permitted travel directions of a first road arrow marking detected at a first time point" is less than the "number of types t2 of directions other than a straight direction included in the permitted travel directions of the traveling lane included in second road arrow information already stored in the storage device at the first time point."

When the specific condition is not satisfied (that is, t1=t2 or t1>t2), the first road arrow information is likely to be as accurate as or more accurate than the second road arrow information. Meanwhile, when the specific condition is satisfied (that is, t1<t2), the first road arrow information is likely to have a smaller amount of information than that of the second road arrow information (to be not as accurate as the second road arrow information). Thus, by performing overwrite processing or retention processing based on whether or not the specific condition is satisfied, it is possible to determine whether or not the execution condition is satisfied at the first time point based on road arrow information that is more accurate. As a result, the determination accuracy of the execution condition can be enhanced, and driving support control can be appropriately executed.

In one aspect of the present invention, the control unit (10) is configured to: perform the overwrite processing (Step 860) when the specific condition is not satisfied ("No" in Step 840); and perform the retention processing (Step 850) when the specific condition is satisfied ("Yes" in Step 840).

With this configuration, it is possible to inhibit driving support control from being halted or not operating when the vehicle is going to turn right or left at the intersection, and to appropriately execute the driving support control.

In one aspect of the present invention, the control unit (10) is configured to: perform the overwrite processing (Step 860) when the specific condition is not satisfied ("No" in Step 840); and when the specific condition is satisfied ("Yes" in Step 840): perform the retention processing (Step 850) in a case in which a control execution condition is satisfied ("Yes" in Step 1210), the control execution condition being satisfied when the driving support control is being executed; and perform the overwrite processing (Step 860) when the control execution condition is not satisfied ("No" in Step 1210).

With this configuration, it is possible to suppress the occurrence of an unrequired operation of driving support control when the vehicle is going to change lanes, and it is possible to appropriately execute the driving support control.

In one aspect of the present invention, the control unit (10) is configured to: store samples of a plurality of types of road arrow markings as a road arrow marking group in a non-volatile storage device in advance; select, when a road arrow marking is detected based on the surrounding information ("Yes" in Step 810), a road arrow marking which is most similar to the detected road arrow marking from the road arrow marking group; calculate a similarity degree of the detected road arrow marking with respect to the selected road arrow marking as a reliability level of the detected road arrow marking; and perform the retention processing when the reliability level is less than a predetermined reliability level threshold value ("No" in Step 1310).

With this configuration, for example, when an overall road arrow marking has become considerably faint due to deterioration over time, and as a result, the reliability level is less than the reliability level threshold value, retention processing is performed.

Thus, a situation in which the road arrow information stored in the storage device is overwritten with less reliable road arrow information is less likely to occur, and a deterioration of the determination accuracy of the execution condition can be suppressed.

In one aspect of the present invention, the driving support apparatus further includes a direction indicator switch (18 (18L, 18R)) configured to detect an operation state of an operation device (WL) to be operated by the driver of the vehicle in order to operate a direction indicator (20), and, in a case in which an intersection is detected based on the surrounding information, the control unit (10) is configured to determine that the predetermined execution condition is satisfied when the operation state of the operation device detected by the direction indicator switch corresponds to a permitted travel direction of the traveling lane indicated by the road arrow information stored in the storage device.

With this configuration, it is possible to appropriately determine whether or not a vehicle is going to turn right or left at the intersection, and thus it is possible to execute driving support control when there is a high possibility that the vehicle is going to turn right or left.

According to at least one embodiment of the present invention, there is provided a driving support method including: causing a surrounding sensor (11, 12) to acquire information relating to a road marking and an intersection present in a front area, which is an area including a road surface in front of a vehicle (V), as surrounding information; executing, when a predetermined execution condition including an intersection being detected based on the surrounding information is satisfied, driving support control including at least one of pre-right/left-turn deceleration assist control of automatically applying a braking force to the vehicle so that a deceleration of the vehicle matches a target deceleration and thereby assisting in deceleration of the vehicle to a predetermined target vehicle speed before the vehicle performs one of a right turn or a left turn at the detected intersection, or pre-right/left-turn warning control of warning a driver of the vehicle and thereby prompting the driver to perform a deceleration operation before the vehicle performs one of a right turn or a left turn at the detected intersection; storing, in a case in which an intersection (I1, I2) is detected based on the surrounding information, when a road arrow marking is detected on a traveling lane (L1, L2), which is a lane on which the vehicle is traveling, road arrow information, which is information including the road arrow marking and permitted travel directions of the traveling lane indicated by the road arrow marking, in a storage device in association with the detected intersection; determining whether a specific condition is satisfied (Step 840), the specific condition being satisfied when, in a case in which a certain intersection is detected based on the surrounding information, the number of types (t1) of directions other than a straight direction included in the permitted travel directions of the traveling lane indicated by a first road arrow marking, which is the road arrow marking detected at a certain first time point, is less than the number of types (t2) of directions other than a straight direction included in the permitted travel directions of the traveling lane included in second road arrow information, which is the road arrow information already stored in the storage device in association with the certain intersection detected at the first time point; performing, based on whether the specific condition is satisfied, one of overwrite processing of overwriting and storing the second road arrow information with first road arrow information, which is road arrow information on the first road arrow marking, at the first time point, or retention processing of retaining the second road arrow information at the first time point; and determining whether the predetermined execution condition is satisfied at the first time point based on the overwritten or retained road arrow information.

According to the above-mentioned driving support method, driving support control can be appropriately executed.

According to at least one embodiment of the present invention, there is provided a non-transitory computer-readable storage medium storing a driving support program for causing a computer to execute processing including: causing a surrounding sensor (11, 12) to acquire information relating to a road marking and an intersection present in a front area, which is an area including a road surface in front of a vehicle (V), as surrounding information; executing, when a predetermined execution condition including an intersection being detected based on the surrounding information is satisfied, driving support control including at least one of pre-right/left-turn deceleration assist control of automatically applying a braking force to the vehicle so that a deceleration of the vehicle matches a target deceleration and thereby assisting in deceleration of the vehicle to a predetermined target vehicle speed before the vehicle performs one of a right turn or a left turn at the detected intersection, or pre-right/left-turn warning control of warning a driver of the vehicle and thereby prompting the driver to perform a deceleration operation before the vehicle performs one of a right turn or a left turn at the detected intersection; storing, in a case in which an intersection (I1,I2) is detected based on the surrounding information, when a road arrow marking is detected on a traveling lane (L1, L2), which is a lane on which the vehicle is traveling, road arrow information, which is information including the road arrow marking and permitted travel directions of the traveling lane indicated by the road arrow marking, in a storage device in association with the detected intersection; determining whether a specific condition is satisfied (Step 840), the specific condition being satisfied when, in a case in which a certain intersection is detected based on the surrounding information, the number of types (t1) of directions other than a straight direction included in the permitted travel directions of the traveling lane indicated by a first road arrow marking, which is the road arrow marking detected at a certain first time point, is less than the number of types (t2) of directions other than a straight direction included in the permitted travel directions of the traveling lane included in second road arrow information, which is the road arrow information already stored in the storage device in association with the certain intersection detected at the first time point; performing, based on whether the specific condition is satisfied, one of overwrite processing of overwriting and storing the second road arrow information with first road arrow information, which is road arrow information on the first road arrow marking, at the first time point, or retention processing of retaining the second road arrow information at the first time point; and determining whether the predetermined execution condition is satisfied at the first time point based on the overwritten or retained road arrow information.

Driving support control can be appropriately executed by causing a computer to execute the driving support program stored on the above-mentioned storage medium.

In the above description, in order to facilitate understanding of the invention, reference symbols used in embodiments of the present invention are enclosed in parentheses and are assigned to each of the constituent features of the invention corresponding to the embodiments. However, each of the constituent features of the invention is not limited to the embodiments defined by the reference symbols.

DESCRIPTION OF THE EMBODIMENTS

First Embodiment (Configuration)

Figure 1:
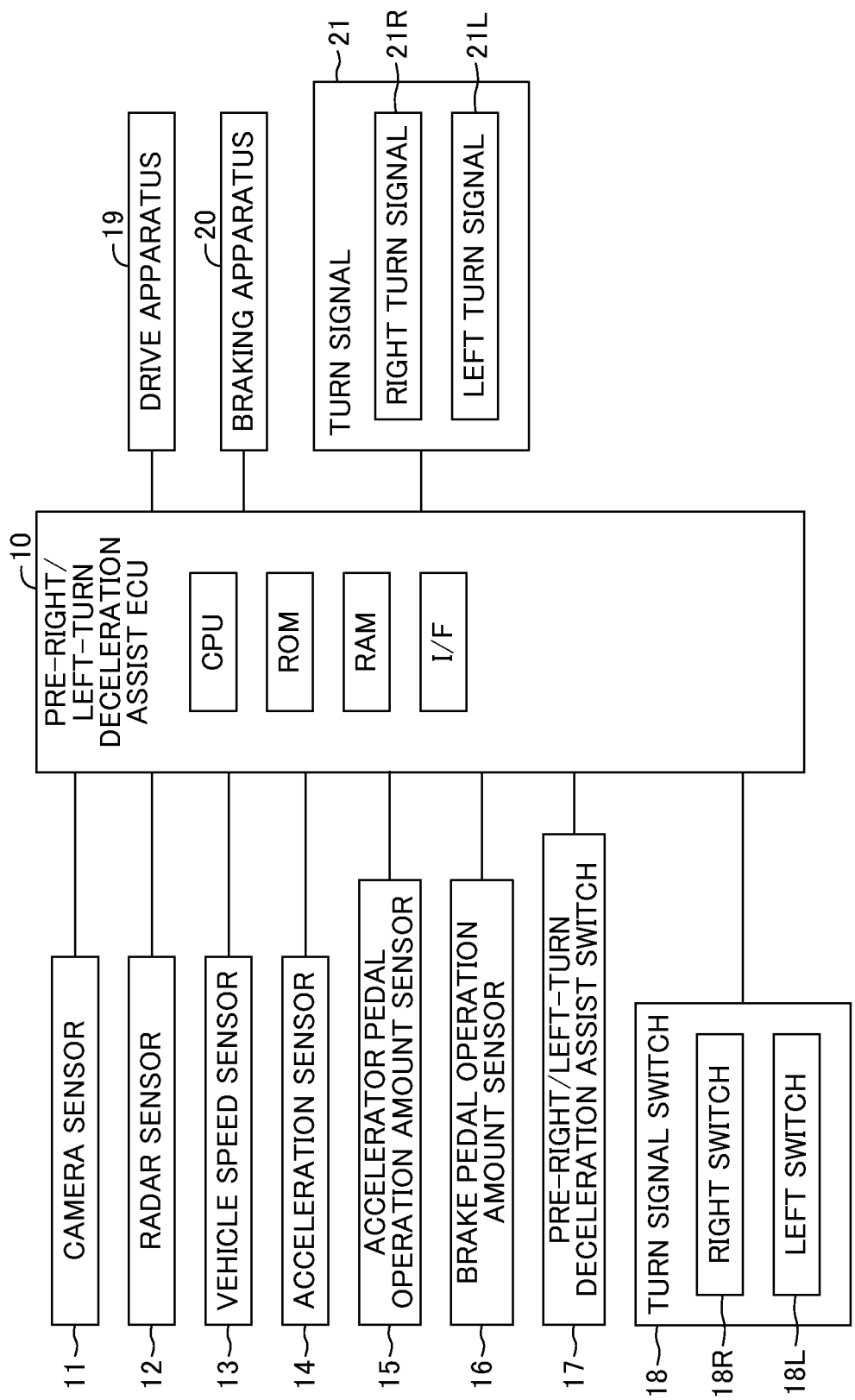
FIG. 1 is a schematic configuration diagram of a driving support apparatus (apparatus of a first embodiment) according to a first embodiment of the present invention.

Now, a driving support apparatus according to a first embodiment of the present invention (hereinafter also referred to as "apparatus of the first embodiment") is described with reference to the drawings. As illustrated in FIG. 1, the apparatus of the first embodiment includes a pre-right/left-turn deceleration assist ECU 10 and a camera sensor 11, a radar sensor 12, a vehicle speed sensor 13, an acceleration sensor 14, an accelerator pedal operation amount sensor 15, a brake pedal operation amount sensor 16, a pre-right/left-turn deceleration assist switch 17, a turn signal switch 18, a drive apparatus 19, a braking apparatus 20, and a turn signal 21, each of which is connected to the pre-right/left-turn deceleration assist ECU 10. The pre-right/left-turn deceleration assist ECU 10 includes a microcomputer as a main part. "ECU" is an abbreviation for electronic control unit. The microcomputer includes, for example, a central processing unit (CPU), a read-only memory (ROM), a random-access memory (RAM), and an interface (I/F). The CPU implements various functions by executing instructions (programs, or routines) stored in the ROM. A part of the functions may be implemented by another ECU. In the following, a vehicle in which the apparatus of the first embodiment is mounted (in other words, the vehicle including the apparatus of the first embodiment) is referred to as "own vehicle."

The pre-right/left-turn deceleration assist ECU 10 is configured to acquire information or signals output, generated, or detected by the sensors and switches 11 to 18 every time a predetermined time elapses, and to control the elements 19 to 21 based on the acquired signals. The pre-right/left-turn deceleration assist ECU 10 is hereinafter also simply referred to as "ECU 10."

The camera sensor 11 is installed on a back surface of a room mirror (inner mirror or rear-view mirror) of the own vehicle. The camera sensor 11 photographs the landscape of a front area, which is an area including the road surface in front of the own vehicle, and recognizes (detects) road markings present in the front area based on the photographed image data. Examples of the road markings include dividing lines extending in front of the own vehicle and a road arrow marking on a traveling lane. The traveling lane is a lane on which the own vehicle is traveling, and is defined as an area between two adjacent dividing lines. The road arrow marking is an arrow-shaped road marking indicating permitted travel directions of the lane, and a plurality of road arrow markings are generally arranged before an intersection at intervals in the direction in which the lane extends. Examples of road arrow markings include "traffic classification by travel direction" and "travel direction." The "traffic classification by travel direction" road arrow marking is generally arranged on each lane of a road having two or more lanes on each side. Meanwhile, the "travel direction" road arrow marking is arranged at a point at which it is required to indicate the direction in which vehicles can travel, and hence the lane type in which this road arrow marking is arranged does not matter.

Figure 2:
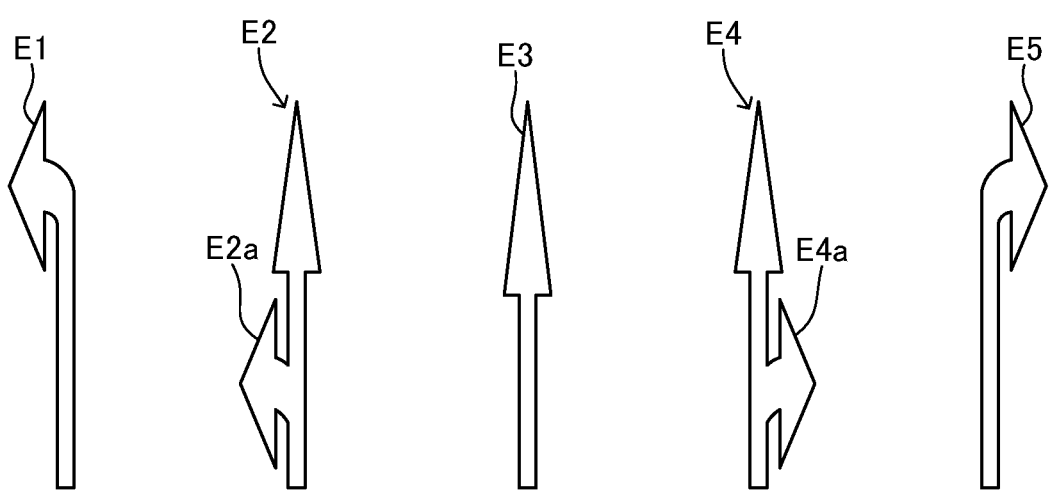
FIG. 2 is a diagram for illustrating types of road arrow markings.

FIG. 2 is a diagram for illustrating the main types of road arrow markings. As illustrated in FIG. 2, the arrow of a road arrow marking E1 points to the left, and hence the permitted travel direction of the lane in which the arrow marking E1 is arranged is the left-turn direction (that is, the lane is a left-turn-only lane). The arrows of a road arrow marking E2 point to the front and to the left, and hence the permitted travel directions of the lane in which the arrow marking E2 is arranged are the straight direction and the left-turn direction. The arrow indicating the left-turn direction of the road arrow marking E2 is hereinafter referred to as "left-turn arrow E2a." The arrow of a road arrow marking E3 points to the front, and hence the permitted travel direction of the lane in which the arrow marking E3 is arranged is the straight direction. The arrows of a road arrow marking E4 point to the front and to the right, and hence the permitted travel directions of the lane in which the arrow marking E4 is arranged are the straight direction and the right-turn direction. The arrow indicating the right-turn direction of the road arrow marking E4 is hereinafter referred to as "right-turn arrow E4a." The arrow of a road arrow marking E5 points to the right, and hence the permitted travel direction of the lane in which the arrow marking E5 is arranged is the right-turn direction (that is, the lane is a right-turn-only lane).

Returning to FIG. 1 to continue the description, the camera sensor 11 includes an image recognition ECU (not shown), and recognizes road arrow markings by machine learning. Specifically, the image recognition ECU learns in advance learning data including all road arrow markings that can be marked on the road surface. The road arrow markings included in the learning data include, for example, arrow markings having different sizes and/or shapes depending on the region, and arrow markings having various degrees of faintness. The road arrow markings are stored in the learning data in association with the permitted travel direction indicated by the relevant arrow marking. The image recognition ECU recognizes the road arrow marking from the image data by using the learning result of the learning data, and calculates the permitted travel direction of the road arrow marking.

In addition, the camera sensor 11 recognizes (detects), in addition to the road markings, a traffic light present in the front area of the own vehicle based on the image data, and calculates a relative relationship between the own vehicle and the traffic light. As used herein, the "relative relationship between the own vehicle and the traffic light" includes the distance from the own vehicle to the traffic light and the direction, for example, of the traffic light with respect to the own vehicle. In addition to the traffic light, the camera sensor 11 may be configured to be able to recognize moving objects such as another vehicle or a pedestrian, and stationary objects such as a median strip and a guardrail. The "relative relationship between the own vehicle and the traffic light" calculated by the camera sensor 11 corresponds to an example of "information relating to an intersection."

The camera sensor 11 acquires the information obtained in this manner as "camera surrounding information," and outputs the camera surrounding information to the ECU 10. The camera sensor 11 corresponds to an example of a "surrounding sensor."

The radar sensor 12 is installed in a center portion of a front grill of the own vehicle. The radar sensor 12 irradiates radio waves in the millimeter wave band to the front area of the own vehicle, and when a three-dimensional object is present, receives reflected waves from the three-dimensional object. The radar sensor 12 calculates the presence/absence of a three-dimensional object and the relative relationship between the own vehicle and the three-dimensional object based on the irradiation timing and reception timing of the radio waves. The radar sensor 12 acquires the information obtained in this manner as "radar surrounding information," and outputs the radar surrounding information to the ECU 10. The radar sensor 12 corresponds to an example of the "surrounding sensor."

The installation position of the radar sensor 12 is not limited to the central portion of the front grill, and may be installed at any position of a front end portion of the own vehicle. For example, the radar sensor 12 may be installed in a central portion of a front bumper, or in a central portion of an area between the front bumper and the front grill. As another example, the radar sensor 12 may be installed in at least one of the left corner or the right corner of the front bumper.

The ECU 10 detects the road arrow marking of the traveling lane based on the camera surrounding information, and identifies the permitted travel direction of the traveling lane indicated by the arrow marking. Further, the ECU 10 detects an intersection by detecting a traffic light based on the camera surrounding information and the radar surrounding information. Through detection of the traffic light based on the radar surrounding information in addition to the camera surrounding information, the calculation accuracy of the relative relationship between the own vehicle and the traffic light is improved. That is, the detection accuracy of the intersection is improved. The camera surrounding information and the radar surrounding information correspond to an example of "surrounding information." However, the apparatus of the first embodiment is not required to include the radar sensor 12. In this case, the camera surrounding information alone corresponds to an example of the "surrounding information."

The vehicle speed sensor 13 generates a signal corresponding to a traveling speed of the own vehicle (hereinafter referred to as "vehicle speed"). The ECU 10 acquires the signal generated by the vehicle speed sensor 13, and calculates the vehicle speed based on the signal.

The acceleration sensor 14 generates a signal corresponding to the acceleration or deceleration of the own vehicle. The ECU 10 acquires the signal generated by the acceleration sensor 14, and calculates the acceleration or deceleration based on the signal. Deceleration has a negative value. As the deceleration becomes smaller, the degree of deceleration becomes larger.

The accelerator pedal operation amount sensor 15 generates a signal corresponding to an operation amount when an accelerator pedal is depressed by a driver of the own vehicle. The ECU 10 acquires the signal generated by the accelerator pedal operation amount sensor 15, and calculates an accelerator pedal operation amount based on the signal. When the calculated accelerator pedal operation amount is equal to or less than a predetermined accelerator pedal operation amount threshold value, the ECU 10 determines that the accelerator pedal operation has not been performed.

The brake pedal operation amount sensor 16 generates a signal corresponding to an operation amount when a brake pedal is depressed by the driver. The ECU 10 acquires the signal generated by the brake pedal operation amount sensor 16, and calculates a brake pedal operation amount based on the signal. When the calculated brake pedal operation amount is equal to or less than a predetermined brake pedal operation amount threshold value, the ECU 10 determines that the brake pedal operation has not been performed.

The pre-right/left-turn deceleration assist switch 17 (hereinafter also simply referred to as "deceleration assist switch 17") is arranged near a driver's seat, and can be operated by the driver. The deceleration assist switch 17 is a switch that enables the driver to select whether or not the driver wishes to execute pre-right/left-turn deceleration assist control when an execution condition described later is satisfied. The pre-right/left-turn deceleration assist control is a type of driving support control which automatically applies a braking force to the own vehicle so that a deceleration of the own vehicle matches a target deceleration and thereby assists in deceleration of the own vehicle before the own vehicle performs a right or left turn at an intersection (described later). The target deceleration is a deceleration required in order to reduce the vehicle speed to a predetermined target vehicle speed. The target vehicle speed is the upper limit value of the vehicle speed at which the vehicle can properly (safely) turn right or left at the intersection. The target vehicle speed can be set in advance by experiment or simulation. In the following, the pre-right/left-turn deceleration assist control is also simply referred to as "deceleration assist control."

When the deceleration assist switch 17 is turned on, a control permission signal is transmitted to the ECU 10 during the period in which the switch is in an on state. When the ECU 10 receives the control permission signal, the ECU 10 executes deceleration assist control under the condition that another predetermined condition is satisfied. When the deceleration assist switch 17 is turned off, the transmission of the control permission signal is stopped.

The turn signal switch 18 is arranged on a turn signal lever WL (not shown). The turn signal lever WL is an operation device to be operated by the driver in order to operate (flash on and off) a turn signal, and is arranged on a steering column. The turn signal lever WL is operated when the own vehicle turns left, turns right, or changes lanes based on a driving operation by the driver. The turn signal lever WL and the turn signal switch 18 correspond to examples of an "operation device" and a "direction indicator switch," respectively.

Specifically, the turn signal lever WL is configured to be movable to a right position PR or a left position PL, which are each a position rotated to the right or to the left, respectively, about a support shaft by a predetermined angle from a neutral position. The turn signal switch 18 includes a right switch 18R and a left switch 18L. The right switch 18R is turned on (generates an ON signal) when the turn signal lever WL is in the right position PR, and is turned off (generates an OFF signal) in other cases. The left switch 18L is turned on (generates an ON signal) when the turn signal lever WL is in the left position PL, and is turned off (generates an OFF signal) in other cases. The ECU 10 acquires the signal generated by the turn signal switch 18, and detects an operation state of the turn signal lever WL based on the signal.

The drive apparatus 19 is an apparatus for applying, to drive wheels of the own vehicle, a driving force for causing the own vehicle to travel. The braking apparatus 20 is an apparatus for applying, to wheels of the own vehicle, a braking force for braking the own vehicle.

The ECU 10 causes the drive apparatus 19 and/or the braking apparatus 20 to execute deceleration assist control by controlling the operation of the drive apparatus 19 and/or the braking apparatus 20 to control the driving force and/or the braking force. Thus, deceleration assist control is executed by the ECU 10 controlling the operation of the drive apparatus 19 and/or the braking apparatus 20, and hence such control is hereinafter also simply referred to as "the ECU 10 executes deceleration assist control."

The turn signal 21 includes a right turn signal 21R and a left turn signal 21L. The right turn signal 21R is installed in a right front corner and a right rear corner of the own vehicle. The left turn signal 21L is installed in a left front corner and a left rear corner of the own vehicle. During the period in which the turn signal lever WL is positioned at the right position PR or the left position PL (that is, during the period in which the right switch 18R or the left switch 18L is generating an ON signal), the ECU 10 causes the corresponding turn signal 21 (21R, 2U) to flash on and off. The turn signal 21 may be controlled by another ECU (for example, a meter ECU). The turn signal 21 corresponds to an example of the "direction indicator."

(Details of Operation)

Next, the details of the operation of the ECU 10 are described. The ECU 10 executes deceleration assist control when the execution condition is satisfied. The execution condition is satisfied when all of the following conditions 1 to 7 are satisfied. The ECU 10 ends the control at the time point at which at least one of the conditions 1 to 7 is no longer satisfied during the execution of deceleration assist control.

(Condition 1) The deceleration assist switch 17 is in the ON state.
(Condition 2) An intersection has been detected.
(Condition 3) Road arrow information (described later) is stored in the RAM of the ECU 10.
(Condition 4) The turn signal switch 18 is in the ON state.
(Condition 5) The permitted travel direction(s) of the traveling lane included in the road arrow information include(s) the ON direction of the turn signal switch 18.
(Condition 6) The accelerator pedal operation and the brake pedal operation are both not being performed.
(Condition 7) The vehicle speed is higher than the target vehicle speed.

The ECU 10 determines that the condition 1 is satisfied when the ECU 10 is receiving the control permission signal from the deceleration assist switch 17.

In a case in which the condition 1 is satisfied, the ECU 10 determines that the condition 2 is satisfied when a traffic light is detected based on the camera surrounding information and the radar surrounding information.

In a case in which the conditions 1 and 2 are satisfied, when the permitted travel directions of the traveling lane indicated by the road arrow marking detected based on the camera surrounding information are identified, the ECU 10 is configured to store road arrow information, which is "information including the road arrow marking and the permitted travel directions of the traveling lane indicated by the road arrow marking," in the RAM in association with the intersection (the intersection detected based on satisfaction of the condition 2). In principle, the ECU 10 is configured to overwrite the road arrow information stored in the RAM with the latest road arrow information. In the case in which the conditions 1 and 2 are satisfied, the ECU 10 determines that the condition 3 is satisfied when the road arrow information is stored in the RAM.

However, in a configuration in which the road arrow information is always overwritten with the latest road arrow information, there is a possibility that deceleration assist control cannot be appropriately executed. Thus, the ECU 10 is configured to not overwrite the road arrow information when a specific condition described later is satisfied. The details of such a case are described later.

In a case in which the conditions 1 to 3 are satisfied, the ECU 10 determines that the condition 4 is satisfied when the signal acquired from the turn signal switch 18 includes the ON signal of the right switch 18R or the left switch 18L.

In a case in which the conditions 1 to 4 are satisfied, the ECU 10 determines that the condition 5 is satisfied when the direction of the turn signal switch 18 in the ON state (that is, the right direction when the right switch 18R is in the ON state and the left direction when the left switch 18L is in the ON state) is included in the permitted travel directions of the traveling lane included in the road arrow information. For example, the condition 5 is satisfied when the permitted travel directions of the traveling lane included in the road arrow information are "straight direction and left-turn direction" and the left switch 18L is in the ON state.

In a case in which the conditions 1 to 5 are satisfied, the ECU 10 determines that the condition 6 is satisfied when the accelerator pedal operation amount calculated based on the signal acquired from the accelerator pedal operation amount sensor 15 is equal to or less than the predetermined accelerator pedal operation amount threshold value and the brake pedal operation amount calculated based on the signal acquired from the brake pedal operation amount sensor 16 is equal to or less than the predetermined brake pedal operation amount threshold value.

In a case in which the conditions 1 to 6 are satisfied, the ECU 10 determines that the condition 7 is satisfied when the vehicle speed calculated based on the signal acquired from the vehicle speed sensor 13 is higher than the target vehicle speed.

Figure 3:
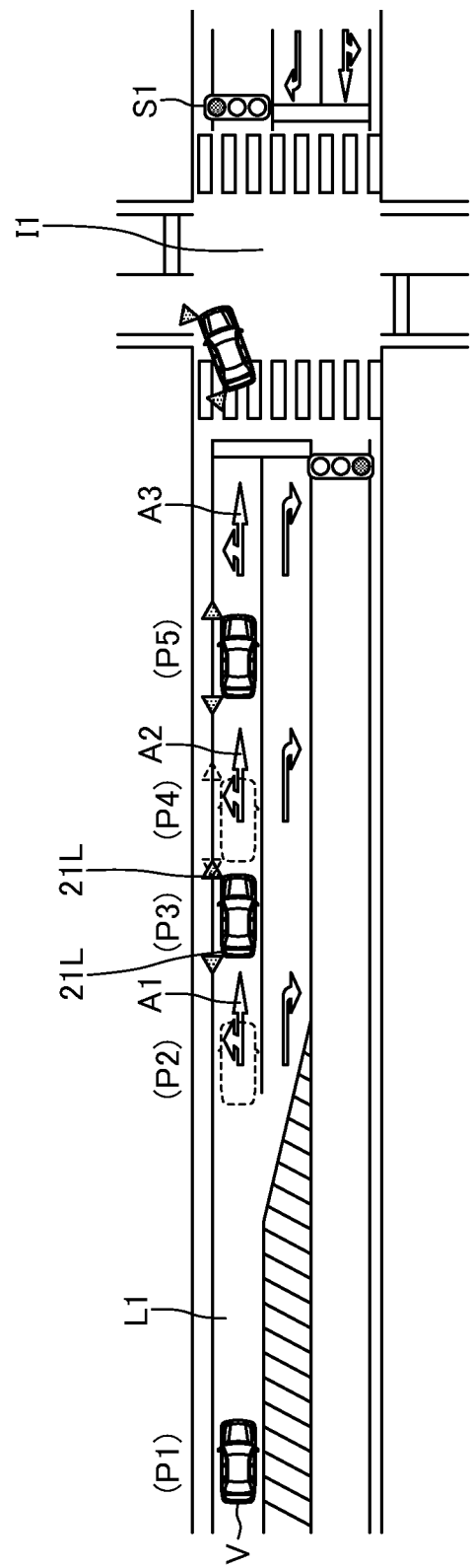
FIG. 3 is a diagram for illustrating an execution condition of pre-right/left-turn deceleration assist control.

A specific description is now given with reference to FIG. 3. FIG. 3 is a diagram for illustrating changes over time in the behavior of an own vehicle V which is going to turn left at an intersection I1. In FIG. 3, in order to make the diagram easier to understand, the own vehicle V is indicated by a broken line when the own vehicle V is positioned on a road arrow marking. This also applies to the other drawings described later. In FIG. 5B and FIG. 6B, even when own vehicles V interfere with each other, one of those own vehicles V is indicated by a broken line.

In the example of FIG. 3, it is assumed that the deceleration assist switch 17 is in the ON state and the condition 1 is satisfied. The ECU 10 detects the intersection I1 positioned in front of the own vehicle V by detecting a traffic light S1 at a position P1. As a result, the condition 2 is satisfied. Further, at the position P1, the ECU 10 detects a road arrow marking A1 of a traveling lane L1. The road arrow marking A1 is the same type as the road arrow marking E2 of FIG. 2. Accordingly, the ECU 10 stores the road arrow information, which is "information including the road arrow marking A1 and the permitted travel directions (straight direction and left-turn direction) of the traveling lane L1 indicated by the road arrow marking A1," in the RAM in association with the intersection I1. As a result, the condition 3 is satisfied. In the following, "permitted travel directions of the traveling lane indicated by the road arrow marking X" is also simply referred to as "permitted travel directions of the road arrow marking X." Further, "information including the road arrow marking X and the permitted travel directions of the traveling lane indicated by the road arrow marking X" is also simply referred to as "road arrow information on the road arrow marking X."

After that, when the own vehicle V travels straight on the traveling lane L1 and reaches a position P2, the road arrow marking A1 is not detectable, and thus the ECU 10 detects a road arrow marking A2. The road arrow marking A2 is also the same type as the road arrow marking E2 (see FIG. 2). Accordingly, there is no substantial change in the road arrow information. Next, at a position P3, the driver of the own vehicle V rotates the turn signal lever WL to the left to move the turn signal lever WL to the left position PL. As a result, at the position P3, the left switch 18L changes from the OFF state to the ON state, and hence the ECU 10 causes the left turn signal 21L to start flashing on and off. As a result, the condition 4 is satisfied.

At the position P3, the permitted travel directions (straight direction and left-turn direction) of the traveling lane included in the road arrow information includes the ON direction (left direction) of the turn signal switch 18. As a result, the condition 5 is satisfied. In the example of FIG. 3, it is assumed that the accelerator pedal operation and the brake pedal operation are both not being performed by the driver. Further, it is assumed that the own vehicle V is traveling at a certain vehicle speed at the position P3, and the vehicle speed is higher than the target vehicle speed. In this case, the condition 6 and the condition 7 are satisfied at the position P3.

As a result, the execution condition is satisfied, and hence the ECU 10 starts deceleration assist control at the position P3. In the example of FIG. 3, the execution condition is satisfied in the section from the position P3 to a position P4, and thus the ECU 10 continues to execute deceleration assist control. After that, when the own vehicle V reaches the position P4, the road arrow marking A2 is not detectable, and thus the ECU 10 detects a road arrow marking A3. The road arrow marking A3 is also the same type as the road arrow marking E2 (see FIG. 2). Accordingly, there is no substantial change in the road arrow information, and the ECU 10 continues to execute deceleration assist control. As a result, when the vehicle speed becomes equal to or lower than the target vehicle speed at a position P5, the execution condition is not satisfied due to the non-satisfaction of the condition 7, and thus the ECU 10 ends the deceleration assist control.

In the example of FIG. 3, deceleration of the own vehicle V is assisted before the own vehicle V turns left at the intersection I1, and hence the vehicle speed can be reduced to the target vehicle speed and the own vehicle V can turn left properly (safely). The ECU 10 is configured to delete the road arrow information from the RAM at the time point at which there is a change from a state in which a certain intersection (intersection I1 in the example of FIG. 3) is detected (detection state) to a state in which the intersection is not detected (non-detection state) (typically, the time point at which the own vehicle V has passed through the intersection).

Figure 4:
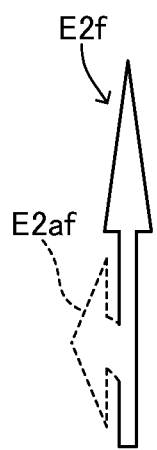
FIG. 4 is a diagram for illustrating a state in which a left-turn arrow of a road arrow marking is faint due to deterioration over time.

The road arrow marking may become faint due to deterioration over time. In FIG. 4, there is illustrated a road arrow marking E1f, which is the road arrow marking E2 (see FIG. 2) in which a portion has become faint due to deterioration over time. In the road arrow marking E2f, only a left-turn arrow E2af is locally faint. The left-turn arrow E2af is faint to the extent that the left-turn arrow E2af is not visible. Accordingly, the left-turn arrow E2af is not detectable by the ECU 10, and as a result, the ECU 10 detects the road arrow marking E2f as the road arrow marking corresponding to the road arrow marking E3 (see FIG. 2). Therefore, the ECU 10 identifies that the permitted travel direction of the traveling lane indicated by the road arrow marking E2f is the "straight direction."

Figure 5A:
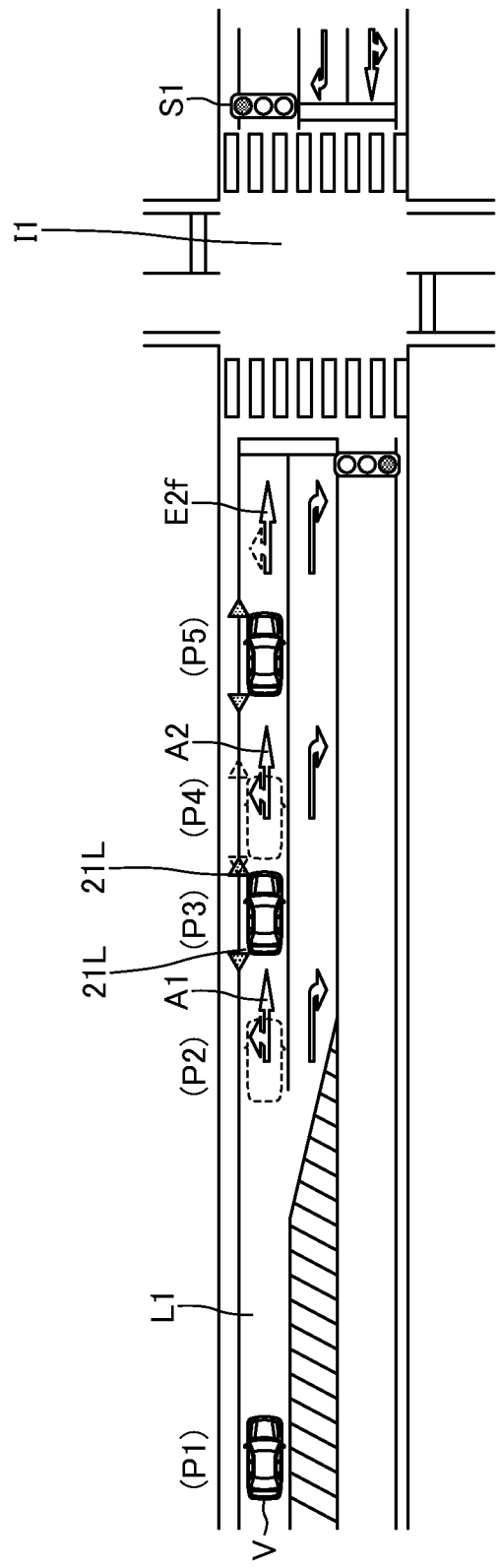
FIG. 5A is a diagram for illustrating an example of overwrite processing and retention processing for a road arrow marking performed when the road arrow marking of FIG. 4 is arranged on a traveling lane.
Figure 5B:
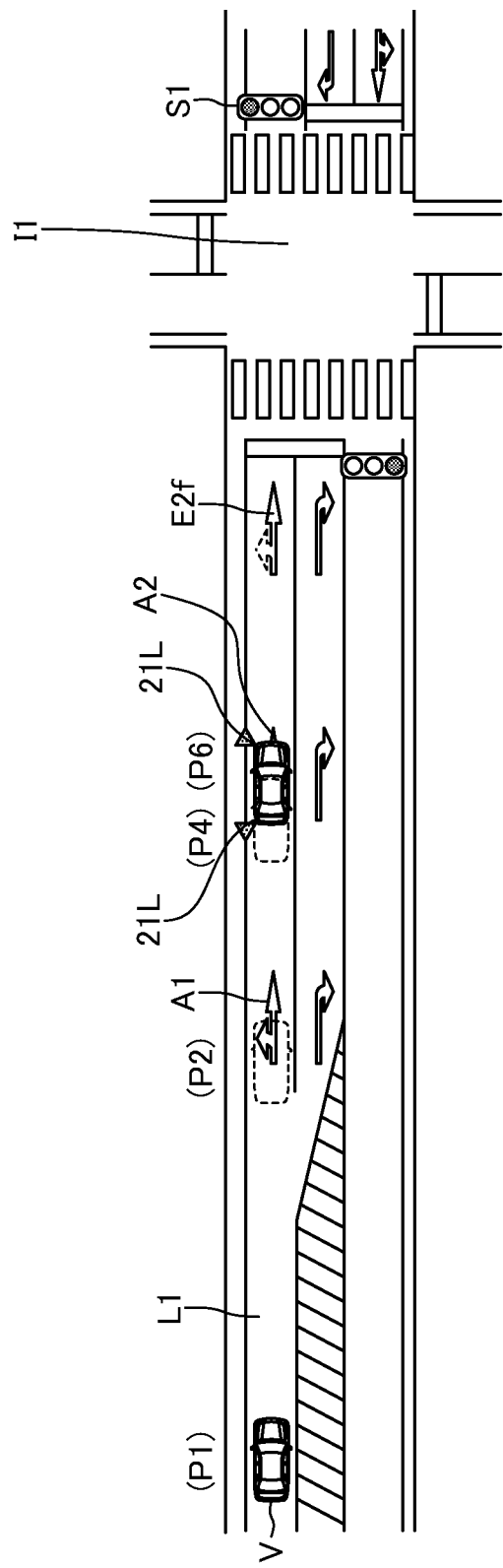
FIG. 5B is a diagram for illustrating another example of overwrite processing and retention processing for a road arrow marking performed when the road arrow marking of FIG. 4 is arranged on the traveling lane.

In FIG. 5A and FIG. 5B, there is illustrated an example in which the road arrow marking E2f is arranged on the traveling lane L1 of FIG. 3 instead of the road arrow marking A3. A description of a problem that may occur when the road arrow marking is the marking E2f instead of the marking A3 is now given with reference to FIG. 5A and FIG. 5B. In the following, the differences from the example of FIG. 3 are mainly described.

In the example of FIG. 5A, the ECU 10 starts deceleration assist control at the position P3. Then, the ECU 10 detects the road arrow marking E2f at the position P4. At this point in time, it is assumed that the ECU 10 overwrites the road arrow information on the road arrow marking A2 stored in the RAM with the road arrow information on the road arrow marking E2f. According to this assumption, the condition 5 is no longer satisfied, and hence the ECU 10 halts deceleration assist control at the position P4. In this case, the vehicle speed has not yet reached the target vehicle speed, and thus the driver may feel uncomfortable with the sudden halt of deceleration assist control.

In the example of FIG. 5B, similarly to the example of FIG. 5A, the ECU 10 detects the road arrow marking E2f at the position P4. At this point in time, it is assumed that the ECU 10 overwrites the road arrow information on the road arrow marking A2 stored in the RAM with the road arrow information on the road arrow marking E2f. According to this assumption, the condition 5 is not satisfied even when the left switch 18L is then changed from the OFF state to the ON state at a position P6 and the left turn signal 21L starts flashing on and off (that is, the condition 4 is satisfied), and hence the ECU 10 does not start deceleration assist control at the position P6. When the vehicle speed has not yet reached the target vehicle speed, the driver may be fearful that the deceleration assist control is not going to operate.

In FIG. 5A and FIG. 5B, there is illustrated a case in which the own vehicle V turns left, but the same problem may occur in the case in which the own vehicle V turns right. Thus, when the left-turn arrow or right-turn arrow of the road arrow marking has become so faint that the left-turn arrow or right-turn arrow cannot be recognized by the camera sensor 11 due to deterioration over time, deceleration assist control is halted or does not operate, and the control may not be appropriately executed.

Figure 6A:
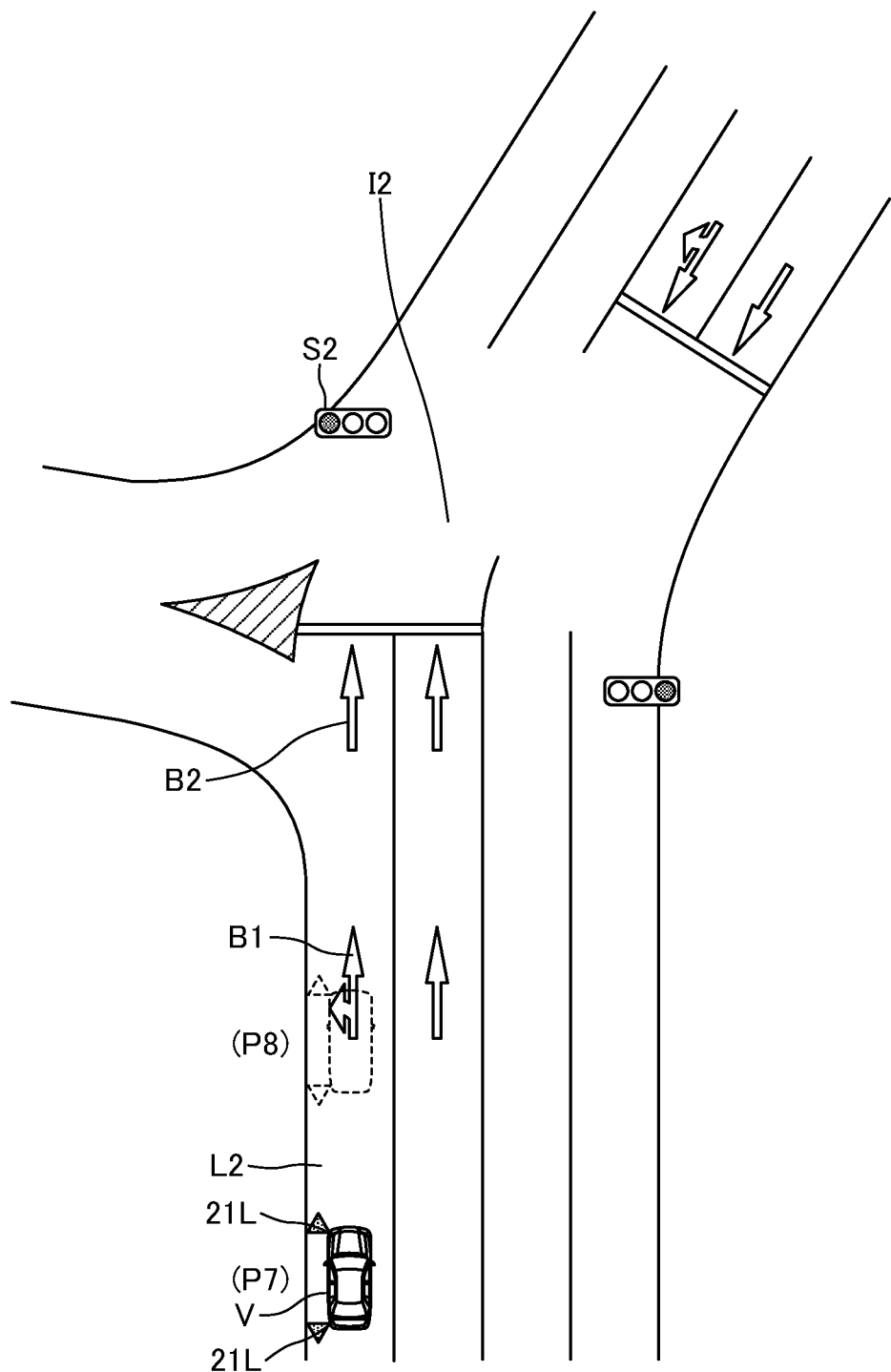
FIG. 6A is a diagram for illustrating an example of overwrite processing and retention processing for a road arrow marking performed when the type of the road arrow marking is changed on the traveling lane.
Figure 6B:
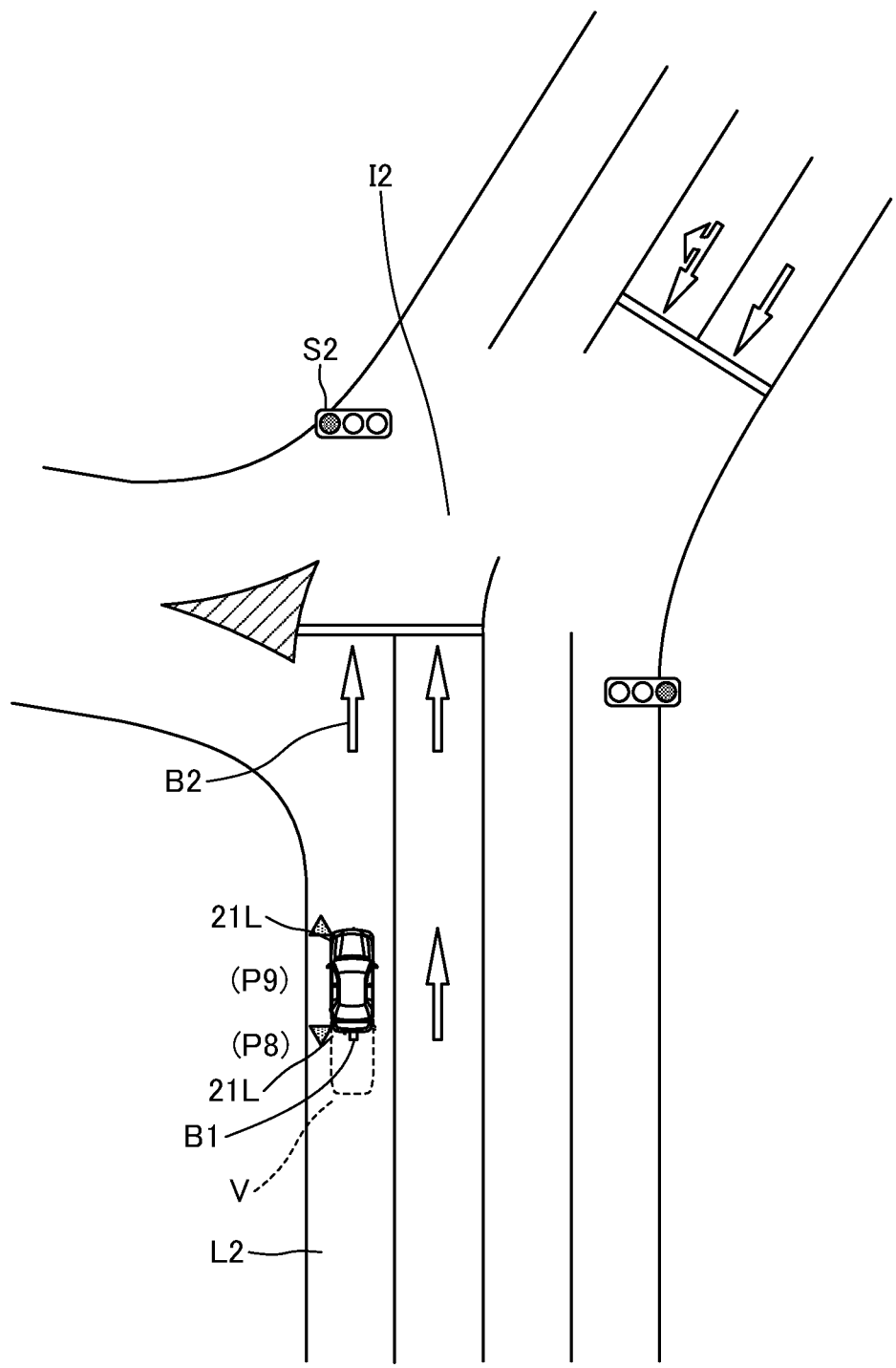
FIG. 6B is a diagram for illustrating another example of overwrite processing and retention processing for a road arrow marking performed when the type of the road arrow marking is changed on the traveling lane.

In addition, the same problem may occur even when the road arrow marking has not become faint due to deterioration over time. There is now given a description with reference to FIG. 6A and FIG. 6B. FIG. 6A and FIG. 6B are diagrams for illustrating change over time in the behavior of the own vehicle V that is going to turn left at an intersection I2. A pedestrian bridge (not shown) is arranged at the intersection I2. As illustrated in FIG. 6A and FIG. 6B, road arrow markings B1 and B2 are arranged in a traveling lane L2. There is no left-turn-only lane on this road. Thus, just before the intersection I2, the traveling lane L2 branches into a lane permitting travel straight ahead and a lane permitting a left turn. Therefore, the permitted travel directions of the road arrow marking B1 are "straight direction and left-turn direction," but the permitted travel direction of road arrow marking B2 is only "straight direction," and the road arrow marking B2 does not have a left-turn arrow. That is, in the traveling lane L2, the type of road arrow marking changes due to the layout of the intersection I2.

In the examples of both FIG. 6A and FIG. 6B, it is assumed that the deceleration assist switch 17 is in the ON state and the condition 1 is satisfied. Further, it is assumed that the ECU 10 is detecting the intersection I2 at a time point (not shown) before the own vehicle V reaches a position P7 (see FIG. 6A), and is detecting the road arrow marking B1 to store the road arrow information on the road arrow marking B1 in the RAM (that is, the conditions 2 and 3 are satisfied).

In the example of FIG. 6A, the left switch 18L changes from the OFF state to the ON state at the position P7 (left turn signal 21L starts flashing on and off). As a result, the condition 4 is satisfied. Then when the own vehicle V travels straight on the traveling lane L2 and reaches a position P8, the road arrow marking B1 is not detectable, and thus the ECU 10 detects the road arrow marking B2. At this point in time, it is assumed that the ECU 10 overwrites the road arrow information on the road arrow marking B1 stored in the RAM with the road arrow information on the road arrow marking B2. According to this assumption, the condition 5 is no longer satisfied, and hence the ECU 10 halts deceleration assist control at the position P8. In this case, the vehicle speed has not yet reached the target vehicle speed, and thus the driver may feel uncomfortable with the sudden halt of deceleration assist control.

In the example of FIG. 6B, similarly to the example of FIG. 6A, the ECU 10 detects the road arrow marking B2 at the position P8. At this point in time, it is assumed that the ECU 10 overwrites the road arrow information on the road arrow marking B1 stored in the RAM with the road arrow information on the road arrow marking B2. According to this assumption, the condition 5 is not satisfied even when the left switch 18L is then changed from the OFF state to the ON state at a position P9 and the left turn signal 21L starts flashing on and off (that is, the condition 4 is satisfied), and hence the ECU 10 does not start deceleration assist control at the position P9. When the vehicle speed has not yet reached the target vehicle speed, the driver may be fearful that the deceleration assist control is not going to operate.

In FIG. 6A and FIG. 6B, there is illustrated a case in which the own vehicle V turns left, but the same problem may also occur in the case in which the own vehicle V turns right. As described above, when the type of the road arrow marking changes due to the layout of the intersection (typically, for a left lane, no left-turn arrow, and for a right lane, no right-turn arrow), deceleration assist control is halted or does not operate, and the control may not be appropriately executed.

Thus, in the first embodiment, the ECU 10 determines whether or not a specific condition is satisfied. The specific condition is satisfied when, in a case in which the conditions 1 to 3 are satisfied, "the number of types of directions other than a straight direction included in the permitted travel directions of the traveling lane indicated by a road arrow marking detected at a certain first time point (hereinafter referred to as 'first road arrow marking')" is less than "the number of types of directions other than a straight direction included in the permitted travel directions of the traveling lane included in the road arrow information already stored in the RAM in association with the certain intersection (intersection detected based on satisfaction of the condition 2) at the first time point (hereinafter referred to as 'second road arrow information')." The second road arrow information already stored in the RAM at the first time point is the road arrow information overwritten at a second time point before the first time point. That is, the road arrow marking included in the second road arrow information is the road arrow marking detected at the second time point. This road arrow marking is hereinafter referred to as "second road arrow marking."

When the specific condition is satisfied, as an exceptional case, the second road arrow information is not overwritten (that is, retention processing of retaining the second road arrow information is performed). Meanwhile, when the specific condition is not satisfied, overwrite processing is performed in which the second road arrow information is overwritten with the first road arrow information (road arrow information on the first road arrow marking) and stored in the RAM.

As used herein, for example, when first road arrow markings are the arrow markings E1 to E5 (see FIG. 2), a "type t1 of directions other than a straight direction included in the permitted travel directions of the traveling lane indicated by the first road arrow marking" is, in order, a left-turn direction, a left-turn direction, none, a right-turn direction, and a right-turn direction. Similarly, for example, when second road arrow markings are the arrow markings E1 to E5 (see FIG. 2), a "type t2 of directions other than a straight direction included in the permitted travel directions of the traveling lane included in the second road arrow marking" is, in order, a left-turn direction, a left-turn direction, none, a right-turn direction, and a right-turn direction.

For example, when the first road arrow marking is the arrow marking E2f (see FIG. 4) or the arrow marking E3 (see FIG. 2) and the second road arrow marking is the arrow marking E2 (see FIG. 2), the type t1 is "none" and the type t2 is "left-turn direction." Accordingly, the type t1 has less directions than the type t2. In this case, the ECU 10 determines that the specific condition is satisfied, and does not overwrite the second road arrow information.

Further, for example, when the first road arrow marking is the arrow marking E2 (see FIG. 2) and the second road arrow marking is the arrow marking E2, the type t1 and the type t2 are both "left-turn direction," and hence the type t1 and the type t2 are the same. In this case, the ECU 10 determines that the specific condition is not satisfied, and overwrites the second road arrow information with the first road arrow information.

In addition, for example, when the first road arrow marking is the arrow marking E2 (see FIG. 2) and the second road arrow marking is the arrow marking E2f (see FIG. 4), the type t1 is "left-turn direction" and the type t2 is "none," and hence the type t1 has more directions than the type t2. In this case, the ECU 10 determines that the specific condition is not satisfied, and overwrites the second road arrow information with the first road arrow information.

The increase/decrease of the "types of directions other than a straight direction included in the permitted travel directions" is determined separately for the right-turn direction and the left-turn direction. That is, for example, a case in which the ECU 10 erroneously recognizes the first road arrow marking as the arrow marking E2 (see FIG. 2) and the second road arrow marking as the arrow marking E4 (see FIG. 2) is considered. In such a case, the type t1 is "left-turn direction" and the type t2 is "right-turn direction." Accordingly, regarding the left-turn direction, the type t1 has more directions than the type t2, and regarding the right-turn direction, the type t1 has less directions than the type t2.

According to this configuration, in the example of FIG. 5A, the conditions 1 to 3 are satisfied at the position P4 (strictly speaking, the condition 4 is also satisfied), and thus the ECU 10 determines whether or not the specific condition is satisfied. At the position P4, the first road arrow marking is the arrow marking E2f and the second road arrow marking is the arrow marking A2. In this case, the type t1 ("none") has less directions than the type t2 ("left-turn direction"). Therefore, the ECU 10 determines that the specific condition is satisfied, and does not overwrite the road arrow information on the road arrow marking A2 stored in the RAM. As a result, the condition 5 is satisfied at the position P4. At this time, assuming that the conditions 6 and 7 are satisfied, the execution condition is satisfied at the position P4, and hence halting of deceleration assist control at the position P4 can be suppressed, and the possibility that the driver feels uncomfortable due to a sudden halt to the control can be greatly reduced.

In the example of FIG. 5B, the conditions 1 to 3 are satisfied at the position P4, and thus the ECU 10 determines whether or not the specific condition is satisfied. At the position P4, the first road arrow marking is the arrow marking E2f and the second road arrow marking is the arrow marking A2. In this case, the type t1 ("none") has less directions than the type t2 ("left-turn direction"). Therefore, the ECU 10 determines that the specific condition is satisfied, and does not overwrite the road arrow information on the road arrow marking A2 stored in the RAM. As a result, when the condition 4 is subsequently satisfied at the position P6, the condition 5 is also simultaneously satisfied. In such a case, assuming that the conditions 6 and 7 are satisfied, deceleration assist control is started at the position P6, and the possibility that the driver feels uncomfortable because of the control not operating can be greatly reduced.

In the example of FIG. 6A, the conditions 1 to 3 are satisfied at the position P8 (strictly speaking, the condition 4 is also satisfied), and thus the ECU 10 determines whether or not the specific condition is satisfied. At the position P8, the first road arrow marking is the arrow marking B2 and the second road arrow marking is the arrow marking B1. In this case, the type t1 ("none") has less directions than the type t2 ("left-turn direction"). Therefore, the ECU 10 determines that the specific condition is satisfied, and does not overwrite the road arrow information on the road arrow marking B1 stored in the RAM. As a result, the condition 5 is satisfied at the position P8. At this time, assuming that the conditions 6 and 7 are satisfied, the execution condition is satisfied at the position P8, and hence halting of deceleration assist control at the position P8 can be suppressed, and the possibility that the driver feels uncomfortable due to a sudden halt to the control can be greatly reduced.

In the example of FIG. 6B, the conditions 1 to 3 are satisfied at the position P8, and thus the ECU 10 determines whether or not the specific condition is satisfied. At the position P8, the first road arrow marking is the arrow marking B2 and the second road arrow marking is the arrow marking B1. In this case, the type t1 ("none") has less directions than the type t2 ("left-turn direction"). Therefore, the ECU 10 determines that the specific condition is satisfied, and does not overwrite the road arrow information on the road arrow marking B1 stored in the RAM. As a result, when the condition 4 is subsequently satisfied at the position P9, the condition 5 is also simultaneously satisfied. In such a case, assuming that the conditions 6 and 7 are satisfied, deceleration assist control is started at the position P9, and hence the possibility that the driver feels uncomfortable because of the control not operating can be greatly reduced.

As described above, in the first embodiment, when the specific condition is satisfied, the road arrow information stored in the RAM is not overwritten (that is, the road arrow information is retained). As a result, even when the left-turn arrow or right-turn arrow of the road arrow marking has become so faint that the left-turn arrow or right-turn arrow cannot be recognized by the camera sensor 11 due to deterioration over time, or when the type of the road arrow marking changes due to the layout of the intersection, it is possible to inhibit deceleration assist control from being halted or not operating, and to appropriately execute the control.

(Specific Operations)

Next, specific operations of the ECU 10 are described. The CPU of the ECU 10 is configured to repeatedly execute, in parallel, the routine illustrated in the flowcharts of FIG. 7 and FIG. 8 and the routine illustrated in the flowchart of FIG. 9 every time a predetermined calculation period elapses while an ignition switch is in an on position.

Figure 7:
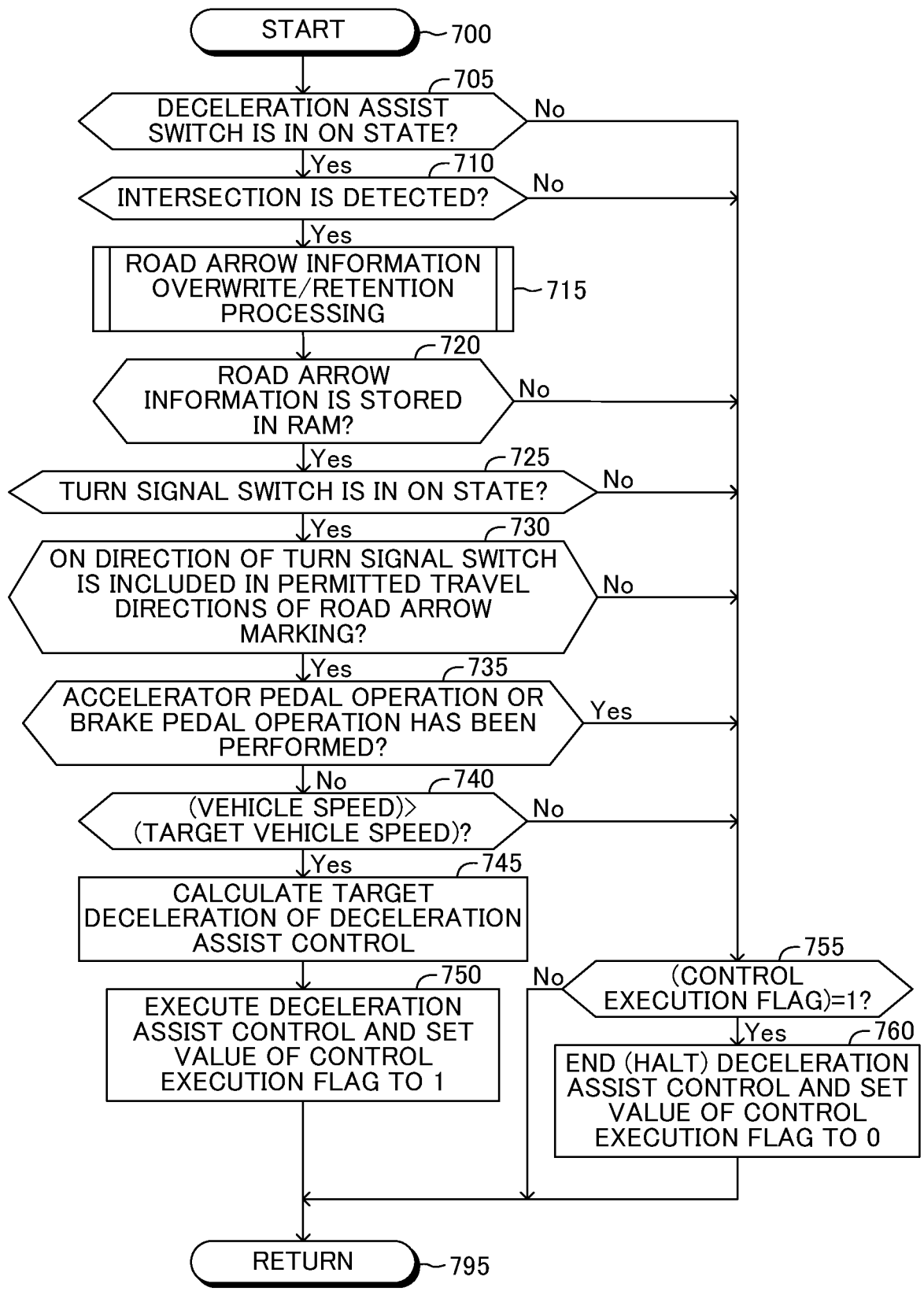
FIG. 7 is a flowchart for illustrating a routine to be executed by a CPU of a pre-right/left-turn deceleration assist ECU of the apparatus of the first embodiment.

At a predetermined timing, the CPU starts processing from Step 700 of FIG. 7, and the process advances to Step 705. Then, the CPU determines whether or not the deceleration assist switch 17 is turned on based on whether or not a control permission signal has been received from the deceleration assist switch 17 (condition 1). When the switch 17 is in the OFF state ("No" in Step 705), the process advances to Step 755.

In Step 755, the CPU determines whether or not a value of a control execution flag is 1. The control execution flag is a flag indicating whether or not deceleration assist control is being executed. When the value of the flag is 1, this indicates that deceleration assist control is being executed, and when the value of the flag is 0, this indicates that deceleration assist control is not being executed. When the deceleration assist control has not yet started and the value of the control execution flag is 0 ("No" in Step 755), the process advances to Step 795, and the CPU temporarily ends this routine.

Meanwhile, when the deceleration assist switch 17 is in the ON state ("Yes" in Step 705), the process advances to Step 710, and the CPU determines whether or not an intersection (in the first embodiment, a traffic light) is detected based on the camera surrounding information and the radar surrounding information (condition 2). When an intersection is not detected ("No" in Step 710), the process advances to Step 755, and the CPU performs the above-mentioned processing. Then, the process advances to Step 795, and the CPU temporarily ends this routine.

Meanwhile, when an intersection is detected ("Yes" in Step 710), the process advances to Step 715, and the CPU executes road arrow information overwrite/retention processing. This processing is described with reference to FIG. 8. When the process advances to Step 715, the CPU starts processing from Step 800 of FIG. 8 and the process advances to Step 810. Then, the CPU determines whether or not a road arrow marking is detected based on the camera surrounding information. When a road arrow marking is not detected ("No" in Step 810), the process advances to Step 895, and the CPU temporarily ends this routine.

Meanwhile, when a road arrow marking is detected ("Yes" in Step 810), the process advances to Step 820, and the CPU determines whether or not road arrow information associated with the intersection detected in Step 710 (see FIG. 7) is already stored in the RAM. When the road arrow information is not yet stored in the RAM ("No" in Step 820), the process advances to Step 830, and the CPU stores the road arrow information on the road arrow marking detected in Step 810 in the RAM in association with the intersection detected in Step 710. Then, the process advances to Step 895, and the CPU temporarily ends this routine.

Meanwhile, when road arrow information associated with the intersection is already stored in the RAM ("Yes" in Step 820), the process advances to Step 840, and the CPU determines whether or not the specific condition is satisfied. The determination is performed by determining whether or not a relationship of "t1<t2" is satisfied between the type t1 of directions other than a straight direction included in the permitted travel directions of the road arrow marking detected in Step 810 and the type t2 of directions other than a straight direction included in the permitted travel directions of the traveling lane included in the road arrow information stored in the RAM.

When the specific condition is satisfied (t1<t2) ("Yes" in Step 840), the process advances to Step 850, and the CPU performs retention processing of retaining the road arrow information stored in the RAM (that is, does not overwrite the road arrow information). Meanwhile when the specific condition is not satisfied (t1≥t2) ("No" in Step 840), the process advances to Step 860, and the CPU performs overwrite processing of overwriting the road arrow information with the road arrow information on the road arrow marking detected in Step 810 and storing the road arrow information in the RAM. When the processing step of Step 850 or Step 860 ends, the process advances to Step 720 of FIG. 7 via Step 895.

In Step 720, the CPU determines whether or not the road arrow information is stored in the RAM based on the result of the road arrow information overwrite/retention processing (see FIG. 8) (condition 3). When the road arrow information is not stored ("No" in Step 720), the process advances to Step 755. Then, the CPU performs the above-mentioned processing, the process advances to Step 795, and the CPU temporarily ends this routine. A case in which the road arrow information is not stored corresponds to a "No" determination in Step 810 (see FIG. 8).

Meanwhile, when the road arrow information is stored ("Yes" in Step 720), the process advances to Step 725, and the CPU determines whether or not the turn signal switch 18 (right switch 18R or left switch 18L) is in the ON state based on the signal acquired from the turn signal switch 18 (condition 4). When the turn signal switch 18 is in the OFF state ("No" in Step 725), the process advances to Step 755, and the CPU performs the above-mentioned processing. Then, the process advances to Step 795, and the CPU temporarily ends this routine.

Meanwhile, when the turn signal switch 18 is in the ON state ("Yes" in Step 725), the process advances to Step 730, and the CPU determines whether or not the "ON direction of the turn signal switch 18" is included in the "permitted travel directions of the traveling lane (permitted travel directions of the road arrow marking) included in the road arrow information stored in the RAM" (condition 5). When the ON direction is not included in the permitted travel directions ("No" in Step 730), the process advances to Step 755, and the CPU performs the above-mentioned processing. Then, the process advances to Step 795, and the CPU temporarily ends this routine.

Meanwhile, when the ON direction is included in the permitted travel directions ("Yes" in Step 730), the process advances to Step 735, and the CPU determines whether or not an accelerator pedal operation or a brake pedal operation has been performed by the driver based on the signals acquired from the accelerator pedal operation amount sensor 15 and the brake pedal operation amount sensor 16 (condition 6). When any one of those pedal operations is being performed ("Yes" in Step 735), the process advances to Step 755, and the CPU performs the above-mentioned processing. Then, the process advances to Step 795, and the CPU temporarily ends this routine.

Meanwhile, when none of those pedal operations is being performed ("No" in Step 735), the process advances to Step 740, and the CPU determines whether or not the vehicle speed is higher than the target vehicle speed set in advance (condition 7).

In a case in which the vehicle speed is equal to or lower than the target vehicle speed ("No" in Step 740), when the value of the control execution flag is 0 in Step 755 (that is, deceleration assist control is not being executed) ("No" in Step 755), the CPU determines that, at the current vehicle speed, the own vehicle can properly turn right or left at the intersection. Thus, the process advances to Step 795, and the CPU temporarily ends this routine (that is, the CPU does not execute deceleration assist control).

Meanwhile, when the vehicle speed is higher than the target vehicle speed ("Yes" in Step 740), the CPU determines that, at the current vehicle speed, the own vehicle may not be able to properly turn right or left at the intersection (in other words, determines that the execution condition is satisfied because all of the conditions 1 to 7 are satisfied), and thus the process advances to Step 745. In Step 745, the CPU calculates the deceleration required to match the vehicle speed with the target vehicle speed as a "target deceleration of deceleration assist control," the process then advances to Step 750, and the CPU starts (executes) deceleration assist control. Further, the CPU sets the value of the control execution flag to 1. Then, the process advances to Step 795, and the CPU temporarily ends this routine.

Meanwhile, in a case in which the vehicle speed is equal to or lower than the target vehicle speed ("No" in Step 740), when the value of the control execution flag is 1 in Step 755 (that is, deceleration assist control is being executed) ("Yes" in Step 755), the CPU determines that the vehicle speed has been decelerated to the target vehicle speed by executing deceleration assist control. Thus, the process advances to Step 760, and the CPU ends deceleration assist control. Further, the CPU sets the value of the control execution flag to 0. Then, the process advances to Step 795, and the CPU temporarily ends this routine.

After deceleration assist control is started (control execution flag=1), when a determination of "No" is made in any of Step 705, Step 710, Step 720, Step 725, or Step 730 and a determination of "Yes" is made in Step 735, the CPU determines that the execution condition is not satisfied, and the process advances to Step 755. The value of the control execution flag is set as 1, and hence the CPU determines "Yes" in Step 755. Then, the process advances to Step 760, and the CPU halts the deceleration assist control. Further, the CPU sets the value of the control execution flag to 0. Then, the process advances to Step 795, and the CPU temporarily ends this routine.

Figure 9:
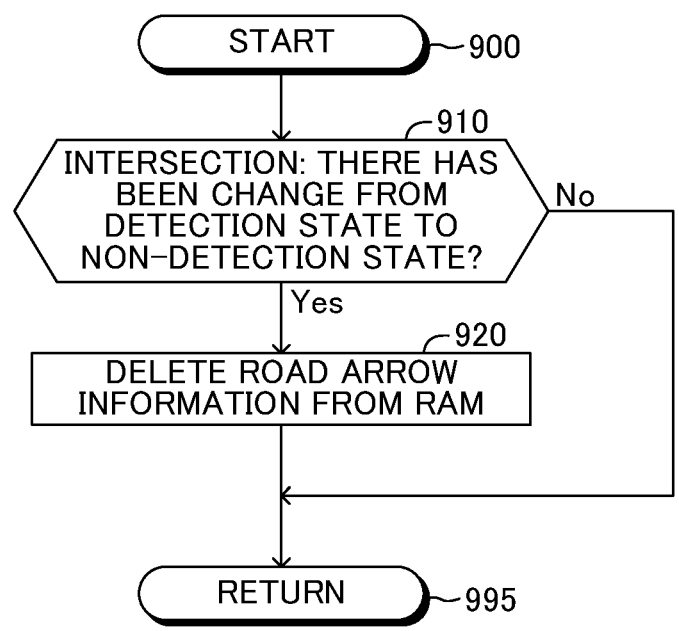
FIG. 9 is a flowchart for illustrating a routine to be executed by the CPU.

In parallel with this, the CPU starts processing from Step 900 of FIG. 9. The process advances to Step 910, and the CPU determines whether or not there has been a change from a state in which an intersection is detected (detection state) to a state in which an intersection is not detected (non-detection state) based on the camera surrounding information and the radar surrounding information. When there has been a change from a detection state to a non-detection state ("Yes" in Step 910), the CPU determines that the own vehicle V has passed through the intersection, the process advances to Step 920, and the CPU deletes the road arrow information stored in the RAM. Then, the process advances to Step 995, and the CPU temporarily ends this routine.

Meanwhile, when a detection state is maintained or when an intersection was not detected in the first place ("No" in Step 910), the process advances to Step 995, and the CPU temporarily ends this routine.

As described above, according to the apparatus of the first embodiment, when the specific condition is not satisfied (that is, when t1=t2 or t1>t2 is satisfied), overwrite processing is performed, and when the specific condition is satisfied (that is, when t1<t2 is satisfied), retention processing is performed. When the specific condition is not satisfied, the first road arrow information is likely to be as accurate as or more accurate than the second road arrow information. Meanwhile, when the specific condition is satisfied, the first road arrow information is likely to have a smaller amount of information than the second road arrow information (not be as accurate as the second road arrow information). Thus, according to the configuration of the apparatus of the first embodiment, it is possible to determine whether or not the execution condition is satisfied based on road arrow information including permitted travel directions which are more accurate, and hence pre-right/left-turn deceleration assist control can be appropriately executed.

Second Embodiment

Next, a driving support apparatus according to a second embodiment of the present invention (hereinafter also referred to as "apparatus of the second embodiment") is described with reference to the drawings. The same reference symbols and step numbers are used for the same configurations and processes as those of the apparatus of the first embodiment, and a detailed description thereof is omitted. This same applies to a modification example of the present invention described later.

The apparatus of the second embodiment is different from the apparatus of the first embodiment in that the apparatus of the second embodiment is configured to perform, even when the specific condition is satisfied, overwrite processing when deceleration assist control is not executed. In the following, the differences from the apparatus of the first embodiment are mainly described in detail with reference to FIG. 10A to FIG. 12.

Figure 10A:
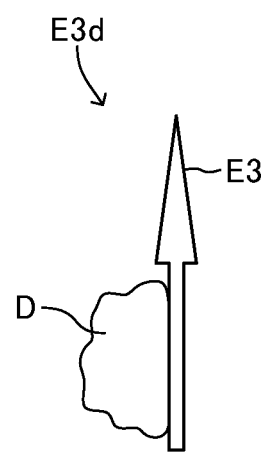
FIG. 10A is a diagram for illustrating a state in which dirt is stuck to the traveling lane near a road arrow marking in the case of a driving support apparatus (apparatus of a second embodiment) according to a second embodiment of the present invention.

In FIG. 10A, there is illustrated a state in which dirt D is stuck to the traveling lane near the road arrow marking E3 (see FIG. 2). The dirt D is positioned at a portion corresponding to the left-turn arrow E2a of the road arrow marking E2 (see FIG. 2). Accordingly, the ECU 10 erroneously detects the dirt D as the left-turn arrow E2a, and as a result, the road arrow marking E3 is detected as a road arrow marking corresponding to the road arrow marking E2. This road arrow marking is hereinafter referred to as "road arrow marking E3d." Due to the erroneous detection, the ECU 10 identifies the permitted travel directions of the traveling lane indicated by the road arrow marking E3d as "straight direction and left-turn direction."

Figure 10B:
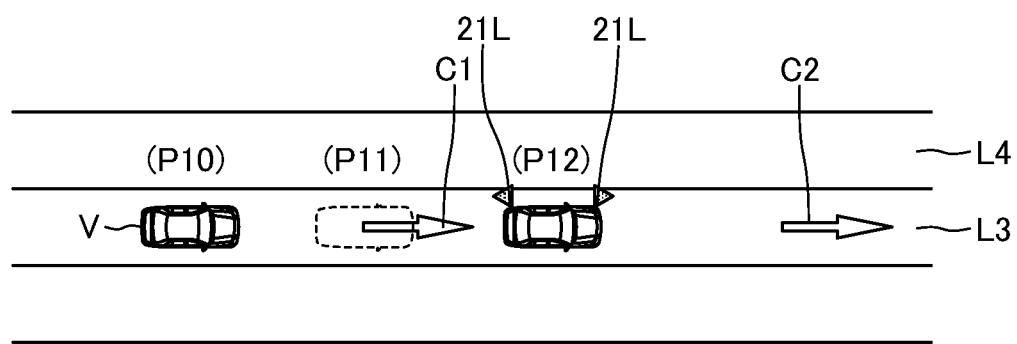
FIG. 10B is a diagram for illustrating an example of overwrite processing and retention processing for a road arrow marking performed when the road arrow marking of FIG. 10A is arranged on the traveling lane.

FIG. 108 is a diagram for illustrating change over time in the behavior of the own vehicle V which is going to change lanes. An intersection (not shown) is positioned in front of the own vehicle V. In the example of FIG. 10B, it is assumed that the deceleration assist switch 17 is in the ON state and the condition 1 is satisfied. Further, it is assumed that the ECU 10 has detected the intersection at a time point (not shown) before the own vehicle V reaches a position P10, and has detected a road arrow marking C1 to store the road arrow information on the road arrow marking C1 in the RAM (that is, the conditions 2 and 3 are satisfied).

In the example of FIG. 108, when the own vehicle V travels straight on a traveling lane L3 and reaches a position P11, the road arrow marking C1 is not detectable, and thus the ECU 10 detects a road arrow marking C2. In this example, the specific condition is not satisfied, and hence at the position P11, the ECU 10 overwrites the road arrow information on the road arrow marking C1 stored in the RAM with the road arrow information on the road arrow marking C2. Then, at a position P12, the driver rotates the turn signal lever WL to the left for the purpose of changing lanes. As a result, the left switch 18L changes from the OFF state to the ON state, and the left turn signal 21L starts to flash on and off (that is, the condition 4 is satisfied). The permitted travel direction of the road arrow marking C2 is "straight direction," and thus the condition 5 is not satisfied. Accordingly, the ECU 10 does not start deceleration assist control. Deceleration assist control is not required when lanes are to be changed, and thus according to this configuration, the driver can appropriately execute the lane change without being hindered by deceleration assist control.

Meanwhile, like in FIG. 10B, a case in which the road arrow marking E3d of FIG. 10A is arranged instead of the road arrow marking C1 is considered. In this case, at the position P10, the road arrow information on the road arrow marking E3d is stored in the RAM. Subsequently, when the own vehicle V reaches the position P11, the ECU 10 detects the road arrow marking C2. In this example, the specific condition is satisfied (t1<t2). At this time point, when it is assumed that the ECU 10 performs retention processing (that is, the road arrow information on road arrow marking E3d is retained), according to this assumption, the condition 5 is satisfied at the time point at which the left switch 18L changes to the ON state at the position P12. At this time, assuming that the conditions 6 and 7 are satisfied, the execution condition is satisfied at the position P12, and hence deceleration assist control is started against the intention of the driver, and is an unrequired operation.

In view of this, in the second embodiment, even when the specific condition is satisfied, overwrite processing is performed when deceleration assist control is not being executed. In the example of FIG. 108, at the time point at which the specific condition is satisfied at the position P11, the condition 4 is not yet satisfied, and thus deceleration assist control is not being executed. Accordingly, at the position P11, the road arrow information on the road arrow marking E3d is overwritten with the road arrow information on the road arrow marking C2. As a result, the condition 5 is no longer satisfied even when the left switch 18L is changed to the ON state at the position P12, and the occurrence of an unrequired operation of deceleration assist control can be suppressed.

Figure 11:
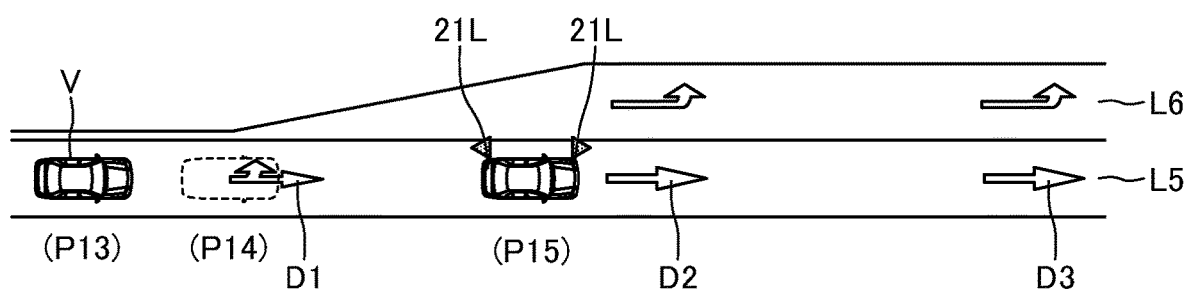
FIG. 11 is a diagram for illustrating an example of overwrite processing and retention processing for a road arrow marking performed when an additional lane is added to the left of the traveling lane.

FIG. 11 is a diagram for illustrating change over time in the behavior of the own vehicle V which is going to change lanes in a case in which an additional lane L6 is added to the left of a traveling lane L5. An intersection (not shown) is positioned in front of the own vehicle V. In the example of FIG. 11, it is assumed that the deceleration assist switch 17 is in the ON state and the condition 1 is satisfied. Further, it is assumed that the ECU 10 has detected the intersection at a time point (not shown) before the own vehicle V reaches a position P13, and has detected a road arrow marking D1 to store the road arrow information on the road arrow marking D1 in the RAM (that is, the conditions 2 and 3 are satisfied).

In the example of FIG. 11, when the own vehicle V travels straight on the traveling lane L5 and reaches a position P14, a road arrow marking D1 is not detectable, and thus the ECU 10 detects a road arrow marking D2. In this example, the specific condition is satisfied (t1<t2) at the position P14, but at the position P14, the driver has not yet operated the turn signal lever WL, and hence the condition 4 is not satisfied. As a result, deceleration assist control is not being executed. Accordingly, at the position P14, the road arrow information on the road arrow marking D1 is overwritten with the road arrow information on the road arrow marking D2. As a result, the condition 5 is no longer satisfied even when the left switch 18L is changed to the ON state at the position P15, and the occurrence of an unrequired operation of deceleration assist control can be suppressed.

Next, specific operations of the ECU 10 are described mainly while looking at the differences from the apparatus of the first embodiment. The CPU of the ECU 10 is configured to repeatedly execute the routine illustrated in the flowchart of FIG. 12 instead of FIG. 8 every time a predetermined calculation period elapses while the ignition switch is in the on position.

Figure 8:
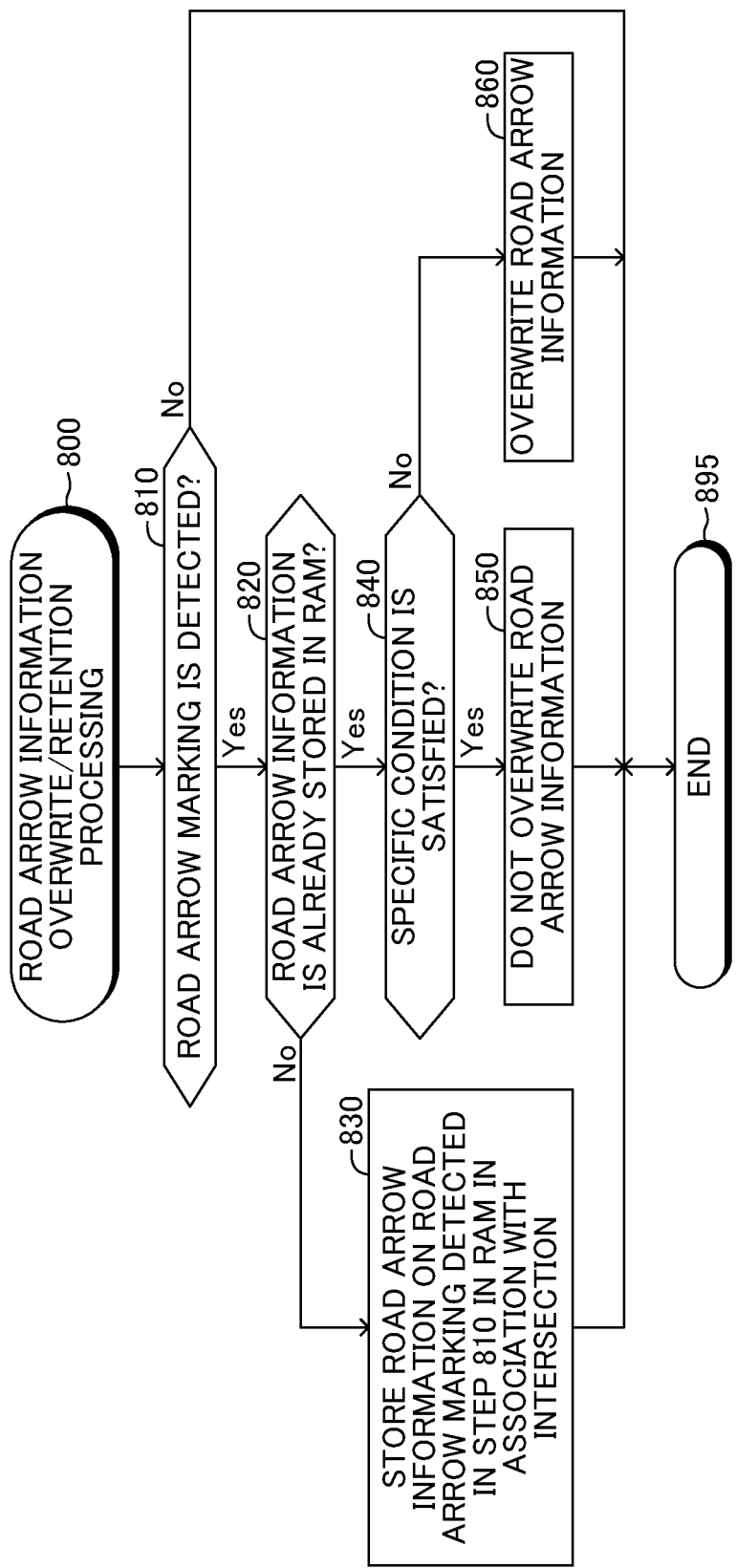
FIG. 8 is a flowchart for illustrating a routine to be executed by the CPU.
Figure 12:
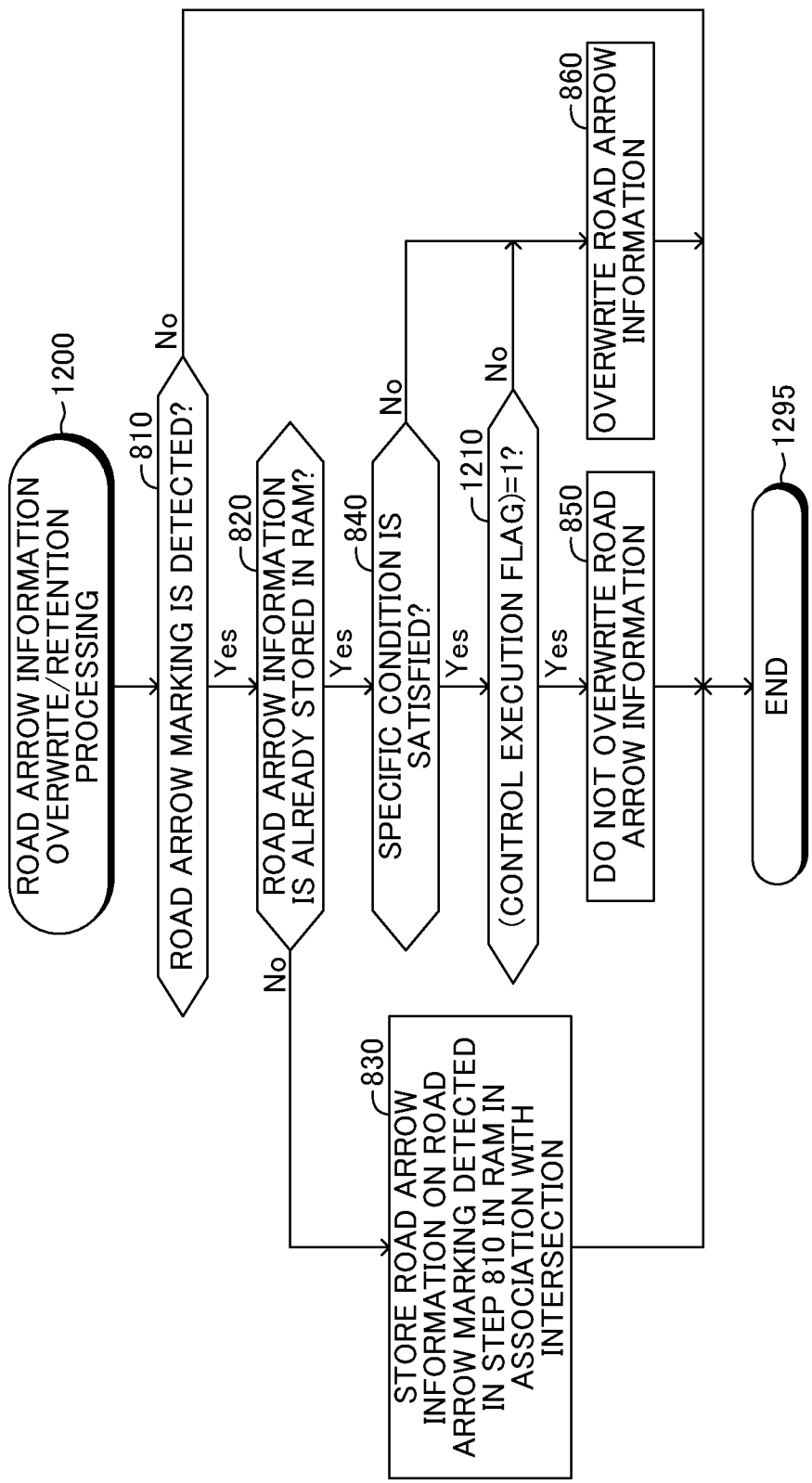
FIG. 12 is a flowchart for illustrating a routine to be executed by a CPU of a pre-right/left-turn deceleration assist ECU of the apparatus of the second embodiment.

The routine of FIG. 12 differs from the routine of FIG. 8 in that Step 1210 is added between Step 840 and Step 850. Specifically, when the specific condition is satisfied ("Yes" in Step 840), the process advances to Step 1210, and the CPU determines whether or not the value of the control execution flag is 1. When the value of the control execution flag is 0 ("No" in Step 1210), the CPU determines that deceleration assist control is not being executed, the process advances to Step 860, and the CPU overwrites the road arrow information. That is, in the second embodiment, even when the specific condition is satisfied, overwrite processing is performed when deceleration assist control is not being executed. As a result, when the driver operates the turn signal lever WL for the purpose of changing lanes, the occurrence of an unrequired operation of deceleration assist control is suppressed.

Meanwhile, when the value of the control execution flag is 1 ("Yes" in Step 1210), the CPU determines that deceleration assist control is being executed, the process advances to Step 850, and the CPU retains (does not overwrite) the road arrow information. When deceleration assist control is being executed, it is considered that the own vehicle is going to turn right or left at the intersection. Accordingly, in such a case, the possibility that deceleration assist control is suddenly halted can be reduced by performing retention processing.

MODIFICATION EXAMPLE

Next, a driving support apparatus according to the modification example of the present invention (hereinafter also referred to as "apparatus of the modification example") is described with reference to the drawings.

The apparatus of the modification example is different from the apparatus of the first embodiment in that the apparatus of the modification example is configured to calculate the reliability level of a road arrow marking detected based on the camera surrounding information, and to determine whether or not the specific condition is satisfied only when the reliability level is equal to or higher than a predetermined reliability level threshold value. There is now mainly given a specific description of the difference with reference to FIG. 13.

Figure 13:
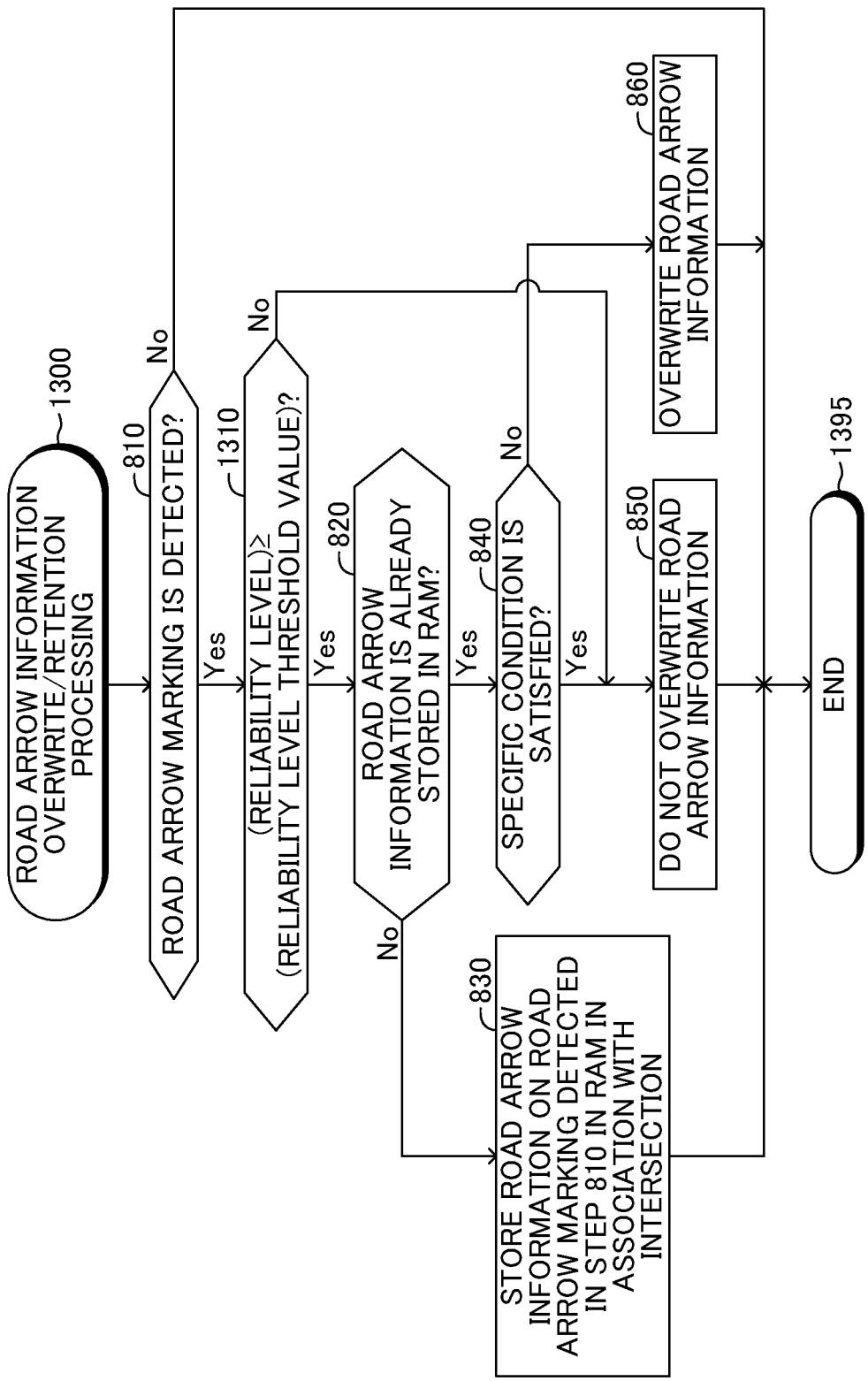
FIG. 13 is a flowchart for illustrating a routine to be executed by a CPU of a pre-right/left-turn deceleration assist ECU of a driving support apparatus (apparatus of a modification example) according to a modification example of the present invention.

The CPU of the ECU 10 is configured to repeatedly execute the routine illustrated in the flowchart of FIG. 13 instead of FIG. 8 every time a predetermined calculation period elapses while the ignition switch is in the on position.

The routine of FIG. 13 differs from the routine of FIG. 8 in that Step 1310 is added between Step 810 and Step 820. Specifically, when a road arrow marking is detected based on the camera surrounding information ("Yes" in Step 810), the process advances to Step 1310, and the CPU calculates the reliability level of the road arrow marking. Samples (examples) of a plurality of types of road arrow markings are stored in advance in the ROM of the ECU 10 as a road arrow marking group. The ECU 10 selects the road arrow marking which is most similar to the road arrow marking detected in Step 810 from the road arrow marking group stored in the ROM, and calculates a "similarity degree of the detected road arrow marking with respect to the selected road arrow marking" by a well-known pattern matching method. The magnitude of the similarity degree reflects the magnitude of the reliability level of the detected road arrow marking, and thus the similarity degree is hereinafter also referred to as "reliability level."

When the reliability level is equal to or higher than the predetermined reliability level threshold value ("Yes" in Step 1310), the CPU executes the processing steps of from Step 820 to Step 860, and the process advances to Step 720 of FIG. 7 via Step 1395. Meanwhile, when the reliability level is less than the reliability level threshold value ("No" in Step 1310), the process advances to Step 850, and the CPU performs retention processing. The reliability level threshold value is set to a value that enables the ECU 10 to identify the permitted travel directions of the road arrow marking at a predetermined accuracy.

With this configuration, the accuracy of the road arrow information is guaranteed, and thus the determination of whether or not the specific condition is satisfied becomes more accurate, and as a result, the determination of whether or not the execution condition is satisfied becomes more accurate. Therefore, deceleration assist control can be executed more appropriately. The configuration of the apparatus of the modification example may be applied to the apparatus of the second embodiment.

The driving support apparatus, the driving support method, and the non-transitory computer-readable storage medium according to the embodiments and the modification example have been described above. However, the present invention is not limited to the embodiments described above, and various variations can be made as long as such variations do not depart from the object of the present invention.

For example, in the embodiments and modification example described above, the execution condition is satisfied when all of the conditions 1 to 7 are satisfied, but the requirement for satisfaction of the execution condition is not limited to this. For example, the driving support apparatus is not required to include the deceleration assist switch 17. In this case, the execution condition is not required to include the condition 1.

Further, the ECU 10 may be configured to determine whether or not the driver has performed a steering operation to the right or to the left based on a steering angle sensor and/or a steering torque sensor (not shown), and to determine that the conditions 4 and 5 are satisfied when the "direction in which the steering operation is performed" is included in the "permitted travel directions of the traveling lane included in the road arrow information."

Further, the condition 6 may be a condition that "the accelerator pedal is not being operated." That is, even when the brake pedal is being operated by the driver, deceleration assist control may be executed (based on satisfaction of another condition) in a case in which the vehicle speed has not reached the target vehicle speed. Moreover, the condition 6 may be a condition that "the brake pedal is not being operated." That is, even when the accelerator pedal is being operated by the driver, deceleration assist control may be executed (based on satisfaction of another condition) in a case in which the vehicle speed has not reached the target vehicle speed.

In addition, the condition 6 may be a condition that "an acceleration operation or a deceleration operation by the driver is not being performed." This condition can be applied to, for example, a driving support apparatus mounted on a one-pedal type vehicle. As used herein, a one-pedal type vehicle is a vehicle in which an acceleration operation and a deceleration operation can be performed by using a single pedal. Typically, a one-pedal type vehicle accelerates when the pedal is depressed and decelerates when the pedal is released.

In addition, pre-right/left-turn warning control may be executed instead of, or in addition to, pre-right/left-turn deceleration assist control when the execution condition is satisfied. The pre-right/left-turn warning control is control of warning the driver of the vehicle such that the driver is prompted to decelerate the own vehicle before the own vehicle performs a right or left turn at an intersection. The warning may be performed by causing a speaker to emit speech, or by causing a buzzer to emit a sound and vibrate.

In addition, generally, a pedestrian crossing (a type of road marking) is arranged near an intersection. The pedestrian crossing includes, near the intersection, a first pedestrian crossing arranged across the road including the traveling lane and a second pedestrian crossing arranged across the road intersecting the road having the traveling lane at the intersection. The camera sensor 11 may be configured to recognize at least one of the first pedestrian crossing or the second pedestrian crossing instead of, or in addition to, recognizing the traffic light based on image data, and to calculate a relative relationship between the own vehicle and the pedestrian crossing. The ECU 10 may detect an intersection based on the relative relationship. In this case, the "relative relationship between the own vehicle and the pedestrian crossing" corresponds to an example of "information relating to an intersection." In some cases, pedestrian crossings are arranged on a road other than near an intersection, but because road arrow markings are not generally arranged in front of such pedestrian crossings, pre-right/left-turn deceleration assist control is not executed.

In addition, a median strip may be arranged near the intersection. A median strip extends along the direction of a traveling lane on a road including the traveling lane, and is temporarily not arranged at intersections. Thus, the camera sensor 11 may be configured to recognize a median strip instead of, or in addition to, recognizing the traffic light based on image data, and to calculate a relative relationship between the own vehicle and the median strip. The ECU 10 may detect, based on the relative relationship, a point at which the median strip is not arranged as an intersection. In this case, the "relative relationship between the own vehicle and the median strip" corresponds to an example of "information relating to an intersection." The ECU 10 may detect the median strip based on the camera surrounding information and the radar surrounding information.

In addition, the apparatus of the first embodiment, the apparatus of the second embodiment, and the apparatus of the modification example can also be mounted on an own vehicle to be used in a country in which right-hand traffic is stipulated. Moreover, the present invention can also be applied to a vehicle traveling by autonomous driving (by autonomous driving control).

What is claimed is:

1. A driving support apparatus, comprising:
a surrounding sensor configured to acquire information relating to a road marking and an intersection present in a front area, which is an area including a road surface in front of a vehicle, as surrounding information; and
a control unit including a storage device, the control unit being configured to execute, when a predetermined execution condition including an intersection being detected based on the surrounding information is satisfied, driving support control including at least one of pre-right/left-turn deceleration assist control of automatically applying a braking force to the vehicle so that a deceleration of the vehicle matches a target deceleration and thereby assisting in deceleration of the vehicle to a predetermined target vehicle speed before the vehicle performs one of a right turn or a left turn at the detected intersection, or pre-right/left-turn warning control of warning a driver of the vehicle and thereby prompting the driver to perform a deceleration operation before the vehicle performs one of a right turn or a left turn at the detected intersection, wherein,
the control unit is configured to:
store, in a case in which an intersection is detected based on the surrounding information, when a road arrow marking is detected on a traveling lane which is a lane on which the vehicle is traveling, road arrow information which is information including the road arrow marking and permitted travel directions of the traveling lane indicated by the road arrow marking, in the storage device in association with the detected intersection;
determine whether a specific condition is satisfied, the specific condition being satisfied when, in a case in which a certain intersection is detected based on the surrounding information and a first road arrow marking and a second road arrow marking exist on the traveling lane toward the certain intersection, the number of types of directions other than a straight direction included in the permitted travel directions of the traveling lane indicated by the first road arrow marking, which is the road arrow marking detected at a certain first time point, is less than the number of types of directions other than a straight direction included in the permitted travel directions of the traveling lane indicated by the second road arrow marking, the second road arrow marking included in second road arrow information, which is the road arrow information already stored in the storage device in association with the certain intersection detected at the first time point;
perform an overwrite processing of overwriting and storing the second road arrow information with first road arrow information, which is road arrow information on the first road arrow marking, at the first time point, when the specific condition is not satisfied;
perform a retention processing of retaining the second road arrow information at the first time point, when the specific condition is satisfied; and
determine whether the predetermined execution condition is satisfied at the first time point based on the overwritten or retained road arrow information.

2. The driving support apparatus according to claim 1, wherein the control unit is configured to:
- when the specific condition is satisfied:
  - perform the retention processing in a case in which a control execution condition is satisfied, the control execution condition being satisfied when the driving support control is being executed; and
  - perform the overwrite processing when the control execution condition is not satisfied.

3. The driving support apparatus according to claim 1, wherein the control unit is configured to:
- store samples of a plurality of types of road arrow markings as a road arrow marking group in a non-volatile storage device in advance;
- select, when a road arrow marking is detected based on the surrounding information, a road arrow marking which is most similar to the detected road arrow marking from the road arrow marking group;
- calculate a similarity degree of the detected road arrow marking with respect to the selected road arrow marking as a reliability level of the detected road arrow marking; and
- perform the retention processing when the reliability level is less than a predetermined reliability level threshold value.

4. The driving support apparatus according to claim 1, further comprising a direction indicator switch configured to detect an operation state of an operation device to be operated by the driver of the vehicle in order to operate a direction indicator,
- wherein, in a case in which an intersection is detected based on the surrounding information, the control unit is configured to determine that the predetermined execution condition is satisfied when the operation state of the operation device detected by the direction indicator switch corresponds to a permitted travel direction of the traveling lane indicated by the road arrow information stored in the storage device.

5. The driving support apparatus according to claim 1, wherein the control unit is configured to:
- store samples of a plurality of types of road arrow markings as a road arrow marking group in a non-volatile storage device in advance;
- select, when a road arrow marking is detected based on the surrounding information, a road arrow marking which is most similar to the detected road arrow marking from the road arrow marking group;
- calculate a similarity degree of the detected road arrow marking with respect to the selected road arrow marking as a reliability level of the detected road arrow marking; and
- perform the retention processing when the reliability level is less than a predetermined reliability level threshold value.

6. A driving support method, comprising:
- causing a surrounding sensor to acquire information relating to a road marking and an intersection present in a front area, which is an area including a road surface in front of a vehicle, as surrounding information;
- executing, when a predetermined execution condition including an intersection being detected based on the surrounding information is satisfied, driving support control including at least one of pre-right/left-turn deceleration assist control of automatically applying a braking force to the vehicle so that a deceleration of the vehicle matches a target deceleration and thereby assisting in deceleration of the vehicle to a predetermined target vehicle speed before the vehicle performs one of a right turn or a left turn at the detected intersection, or pre-right/left-turn warning control of warning a driver of the vehicle and thereby prompting the driver to perform a deceleration operation before the vehicle performs one of a right turn or a left turn at the detected intersection;
- storing, in a case in which an intersection is detected based on the surrounding information, when a road arrow marking is detected on a traveling lane, which is a lane on which the vehicle is traveling, road arrow information, which is information including the road arrow marking and permitted travel directions of the traveling lane indicated by the road arrow marking, in a storage device in association with the detected intersection;
- determining whether a specific condition is satisfied, the specific condition being satisfied when, in a case in which a certain intersection is detected based on the surrounding information and a first road arrow marking and a second road arrow marking exist on the traveling lane toward the certain intersection, the number of types of directions other than a straight direction included in the permitted travel directions of the traveling lane indicated by the first road arrow marking, which is the road arrow marking detected at a certain first time point, is less than the number of types of directions other than a straight direction included in the permitted travel directions of the traveling lane indicated by the second arrow marking, the second arrow marking included in second road arrow information, which is the road arrow information already stored in the storage device in association with the certain intersection detected at the first time point;
- performing an overwrite processing of overwriting and storing the second road arrow information with first road arrow information, which is road arrow information on the first road arrow marking, at the first time point, when the specific condition is not satisfied;
- performing a retention processing of retaining the second road arrow information at the first time point, when the specific condition is satisfied; and
- determining whether the predetermined execution condition is satisfied at the first time point based on the overwritten or retained road arrow information.

7. A non-transitory computer-readable storage medium storing a driving support program for causing a computer to execute processing comprising:
- causing a surrounding sensor to acquire information relating to a road marking and an intersection present in a front area, which is an area including a road surface in front of a vehicle, as surrounding information;
- executing, when a predetermined execution condition including an intersection being detected based on the surrounding information is satisfied, driving support control including at least one of pre-right/left-turn deceleration assist control of automatically applying a braking force to the vehicle so that a deceleration of the vehicle matches a target deceleration and thereby assisting in deceleration of the vehicle to a predetermined target vehicle speed before the vehicle performs one of a right turn or a left turn at the detected intersection, or pre-right/left-turn warning control of warning a driver of the vehicle and thereby prompting the driver to perform a deceleration operation before the vehicle performs one of a right turn or a left turn at the detected intersection;

storing, in a case in which an intersection is detected based on the surrounding information, when a road arrow marking is detected on a traveling lane, which is a lane on which the vehicle is traveling, road arrow information, which is information including the road arrow marking and permitted travel directions of the traveling lane indicated by the road arrow marking, in a storage device in association with the detected intersection;

determining whether a specific condition is satisfied, the specific condition being satisfied when, in a case in which a certain intersection is detected based on the surrounding information and a first road marking and a second road marking exist on the traveling lane toward the certain intersection, the number of types of directions other than a straight direction included in the permitted travel directions of the traveling lane indicated by the first road arrow marking, which is the road arrow marking detected at a certain first time point, is less than the number of types of directions other than a straight direction included in the permitted travel directions of the traveling lane indicated by the second road arrow marking, the second road arrow marking included in second road arrow information, which is the road arrow information already stored in the storage device in association with the certain intersection detected at the first time point;

performing an overwrite processing of overwriting and storing the second road arrow information with first road arrow information, which is road arrow information on the first road arrow marking, at the first time point, when the specific condition is not satisfied;

performing a retention processing of retaining the second road arrow information at the first time point, when the specific condition is satisfied; and determining whether the predetermined execution condition is satisfied at the first time point based on the overwritten or retained road arrow information.

\* \* \* \* \*